(12) United States Patent
Ohbayashi et al.

(10) Patent No.: US 6,472,097 B1
(45) Date of Patent: Oct. 29, 2002

(54) RECHARGEABLE BATTERY USING PRESSURE-CRUSH TYPE PROTECTIVE DEVICE AND PORTABLE ELECTRONIC DEVICE USING THE RECHARGEABLE BATTERY

(75) Inventors: Yoshiaki Ohbayashi, Nara; Naoya Takehara, Higashiosaka; Keiji Mine, Yao; Seisaku Hirai, Yao, all of (JP)

(73) Assignee: Hosiden Corporation, Yao (JP)

( * ) Notice: Subject to any disclaimer, the term of this patent is extended or adjusted under 35 U.S.C. 154(b) by 0 days.

(21) Appl. No.: 09/557,986

(22) Filed: Apr. 25, 2000

(30) Foreign Application Priority Data

Apr. 27, 1999 (JP) .............................. 11-119091

(51) Int. Cl.⁷ ............................................ H01M 2/12
(52) U.S. Cl. ............................. 429/82; 429/61; 429/53; 429/56; 429/72
(58) Field of Search .......................... 429/61, 53, 56, 429/72, 82

(56) References Cited

U.S. PATENT DOCUMENTS 5,585,207 A * 12/1996 Wakabe et al. .............. 429/178
6,232,011 B1 * 5/2001 Azema ......................... 429/61

* cited by examiner

*Primary Examiner*—Carol Chaney
*Assistant Examiner*—Angela J Martin
(74) *Attorney, Agent, or Firm*—Armstrong, Westerman & Hattori, LLP

(57) ABSTRACT

Explosion of rechargeable battery can be prevented in a relatively simple structure, at low cost, and without allowing spouting of electrolyte. A rechargeable battery 100D1 using a pressure-crush type protective device comprises a housing H including an internal electrode plate 120 spirally wound about a positive electrode and a negative electrode through a separator, a jacket 110 for accommodating this internal electrode plate 120, and a sealing body 140 for closing the opening of this jacket 110, a positive electrode (or negative electrode) output electrode 130 connected electrically to the internal electrode plate 120, a spacer 200 disposed beneath the sealing body 140 for insulating between the sealing body 140 and internal electrode plate 120, a pressure-crush type protective device $A_1$ disposed in said spacer 200 as a pressure-sensitive element for detecting the internal pressure in the housing H, and an output terminal 400 connected electrically to one terminal of this pressure-crush type protective device $A_1$ (one end of a conductor layer $210A_1$) for picking up the detection result of the internal pressure detected by the pressure-crush type protective device $A_1$ electrically to outside, in which other terminal of the pressure-crush type protective device $A_1$ (other end of the conductor $210A_1$) is connected electrically to the positive electrode (or negative electrode) output electrode 130.

16 Claims, 25 Drawing Sheets

RECHARGEABLE BATTERY USING PRESSURE-CRUSH TYPE PROTECTIVE DEVICE AND PORTABLE ELECTRONIC DEVICE USING THE RECHARGEABLE BATTERY

TECHNICAL FIELD

The present invention relates to are chargeable battery using a pressure-crush type protective device, and a portable electronic device using this rechargeable battery.

PRIOR ART

Lithium ion batteries and other rechargeable batteries have been hitherto used widely in portable telephones, video cameras, and other electronic devices. In these rechargeable batteries, when falling in overcharged state or short-circuit state due to, for example, trouble or wrong use of electronic device, the inside of the battery is heated, the electrolyte is decomposed to generate gas, the battery internal pressure is elevated, and finally explosion may occur.

To prevent explosion, in conventional rechargeable batteries, for example, an explosion-proof valve is fitted to a sealing body (one side of the housing of the rechargeable battery) for closing the opening of the jacket (the other side of the housing of the rechargeable battery). Therefore, when the internal pressure of the battery elevates, the explosion-proof valve expands and cracks, so that the gas is released.

However, when the explosion-proof valve operates in such manner, the electrolyte in the battery spouts out together with the gas, and this electrolyte may stick to the peripheral circuit board to cause short-circuit, or the electrolyte may be ignited.

In other example, instead of the explosion-proof valve, a protective device for monitoring the battery internal pressure and cutting off current is provided in the battery, between a pair of terminals disposed at the output electrode and the internal electrode plate of the battery. That is, the protective device is connected in series between the output electrode and internal electrode plate. Such protective device is disclosed, for example, in Japanese Patent Laid-open Publications (7-245090, 9-55197), but since the conducting part provided between the terminals is designed to be cut off by using breaking means, stable operation cannot be expected. Yet, such protective device is complicated in structure, and it is difficult to assemble the protective device, and the manufacturing cost of rechargeable batteries is high.

It is hence a primary object of the invention to present a rechargeable battery using a pressure-crush type protective device capable of preventing explosion of rechargeable battery by a relatively simple structure, at a low cost, and in a state not to allow spouting of electrolyte, and a portable electronic device using this rechargeable battery.

SUMMARY OF THE INVENTION

To solve the problems, a rechargeable battery using a pressure-crush type protective device of the invention comprises a housing for accommodating an internal electrode plate in its inside, a pressure-crush type protective device disposed in the housing as a pressure-sensitive element for detecting the internal pressure, and an output terminal disposed in the housing for keeping tightness and insulation for taking out the detection result of the internal pressure detected by the pressure-crush type protective device electrically to outside.

In a rechargeable battery using a pressure-crush type protective device of the invention, one terminal of the pressure-crush type protective device is connected electrically to the output terminal, and other terminal of the pressure-crush type protective device is connected electrically to one output electrode of the rechargeable battery.

A rechargeable battery using a pressure-crush type protective device of the invention relates to the rechargeable battery using a pressure-crush type protective device in which the pressure-crush type protective device comprises a pressure adjusting container forming a recess, a crush plate having a conductor for closing the pressure adjusting container, and a pair of terminals electrically connected to the conductor.

A rechargeable battery using a pressure-crush type protective device of the invention relates to the rechargeable battery using a pressure-crush type protective device in which the pressure-crush type protective device comprises a pressure adjusting container forming a recess, a crush plate having a conductor supported at both sides in the recess of the pressure adjusting container for covering this recess, a pair of terminals electrically connected to the conductor of the crush plate covering the recess of the pressure adjusting container, and a film sheet for closing the pressure adjusting container.

A rechargeable battery using a pressure-crush type protective device of the invention relates to the rechargeable battery using a pressure-crush type protective device in which the pressure-crush type protective device is a pressure-crush type protective device used in a rechargeable battery comprising an internal electrode plate, a positive electrode (or negative electrode) output electrode, a sealing body for closing the opening of an jacket serving also as other electrode, and a spacer disposed beneath the sealing body for insulating between the sealing body and the internal electrode plate, and comprises a crush plate having a recess and a conductor formed in the spacer, fitted in the recess, and forming a pressure adjusting chamber in the recess, a pair of terminals connected electrically to the conductor, and a film sheet adhered to the spacer for sealing the pressure adjusting chamber.

A rechargeable battery using a pressure-crush type protective device of the invention relates to the rechargeable battery using a pressure-crush type protective device in which the pair of terminals are formed in the spacer by inserting.

A rechargeable battery using a pressure-crush type protective device of the invention relates to the rechargeable battery using a pressure-crush type protective device in which the film sheet is light-permeable.

A rechargeable battery using a pressure-crush type protective device of the invention relates to the rechargeable battery using a pressure-crush type protective device in which the pressure-crush type protective device is a pressure-crush type protective device used in a rechargeable battery comprising an internal electrode plate, a positive electrode (or negative electrode) output electrode, a sealing body for closing the opening of an jacket serving also as other electrode, and a spacer disposed beneath the sealing body for insulating between the sealing body and the internal electrode plate, and comprises a crush plate having a recess and a conductor formed in the spacer, fitted in the recess, and forming a pressure adjusting chamber in the recess, a pair of terminals formed in the spacer by inserting and connected electrically to the conductor, and a film sheet adhered to the spacer for sealing the pressure adjusting chamber, and the spacer has an opening for exposing a part of the terminals, the opening is filled with a sealing agent to close the gap between the resin for forming the spacer and the conductive material for forming the terminals, and the film sheet also closes the opening.

A rechargeable battery using a pressure-crush type protective device of the invention relates to the rechargeable battery using a pressure-crush type protective device in which a notch groove for adjusting the pressure is provided in the crush plate.

A rechargeable battery using a pressure-crush type protective device of the invention relates to the rechargeable battery using a pressure-crush type protective device in which the pressure-crush type protective device comprises a pressure adjusting container forming a recess, a crush plate having a conductor supported at one side in the recess of the pressure adjusting container for nearly covering this recess, a pair of terminals electrically connected to the conductor of the crush plate nearly covering the recess of the pressure adjusting container, and a film sheet for closing the pressure adjusting container.

A rechargeable battery using a pressure-crush type protective device of the invention relates to the rechargeable battery using a pressure-crush type protective device in which the pressure-crush type protective device comprises a main body forming a penetration hole, a lid body fitted to this main body for closing the penetration hole, and a bottom body fitted to the main body at the opposite side of the lid body side for closing the penetration hole, and the lid body has a conductor layer for passing over the penetration hole in a state fitted to the main body.

A rechargeable battery using a pressure-crush type protective device of the invention relates to the rechargeable battery using a pressure-crush type protective device in which the lid body is formed more thinly than the main body and the bottom body.

A rechargeable battery using a pressure-crush type protective device of the invention relates to the rechargeable battery using a pressure-crush type protective device in which the pressure-crush type protective device comprises a main body forming a recess, and a lid body fitted to this main body for closing the recess, and the lid body has a conductor layer for passing over the recess in a state fitted to the main body.

A rechargeable battery using a pressure-crush type protective device of the invention relates to the rechargeable battery using a pressure-crush type protective device in which the pressure-crush type protective device comprises a first main body forming a recess, and a second main body having a recess, the bottom of the recess of the first main body is formed more thinly than the bottom of the recess of the second main body, the conductor layer is formed at the back side of the first main body and in the portion corresponding to the bottom of the recess, and when the both main bodies are combined with the recesses face to face, a space formed by both recesses and a communicating portion for communicating with outside are formed between the both main bodies.

A portable electronic device of the invention is a portable electronic device having a rechargeable battery, in which the rechargeable battery is a rechargeable battery using a pressure-crush type protective device above.

Figure 1:
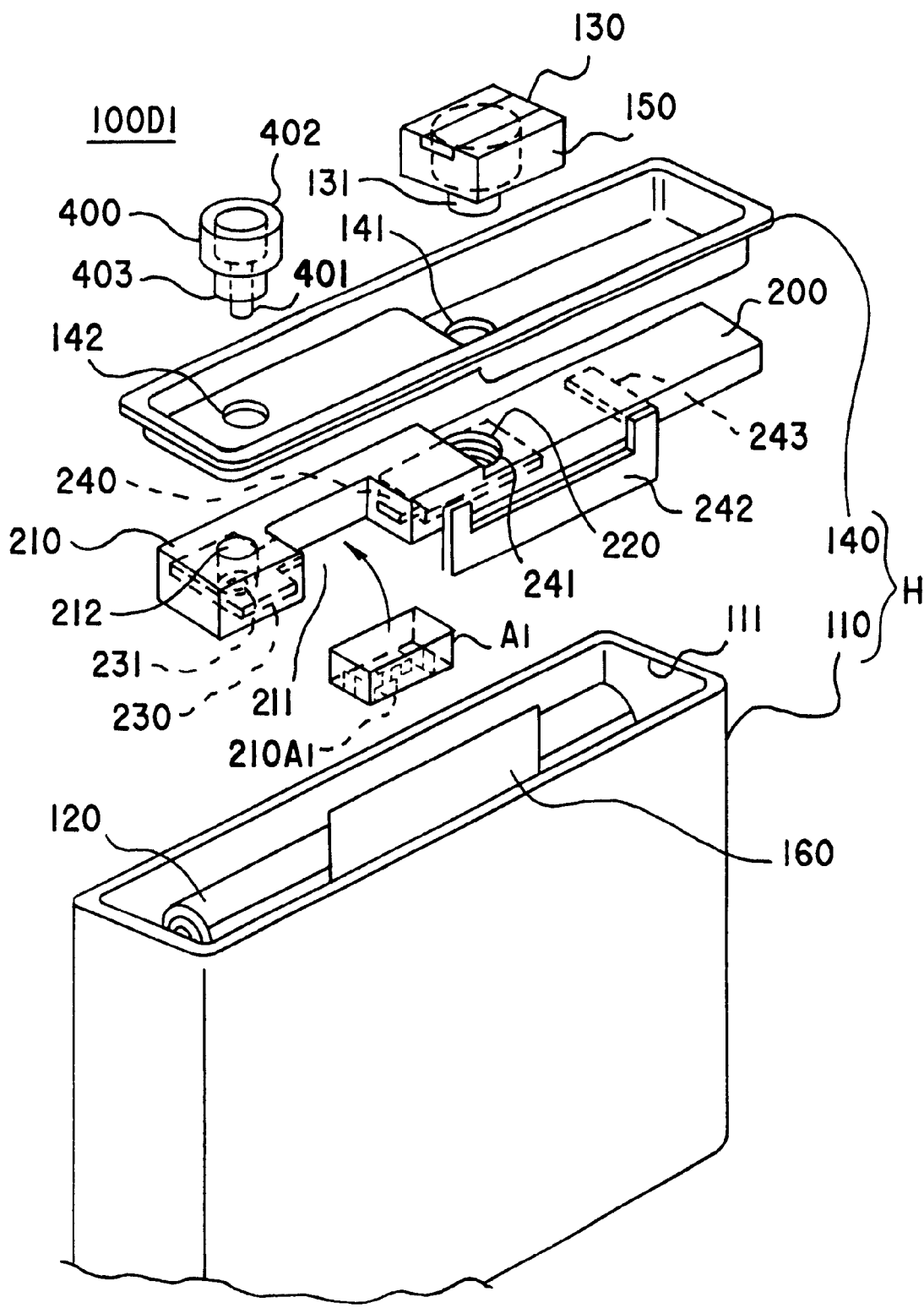
FIG. 1 is a schematic exploded perspective view of a rechargeable battery using a pressure-crush type protective device according to an embodiment of the invention.

REFERENCE NUMERALS $A_1$ Pressure-crush type protective device
H Housing
100D1 Rechargeable battery using pressure-crush type protective device
400 Output terminal

EMBODIMENTS OF THE INVENTION

A rechargeable battery using a pressure-crush type protective device according to an embodiment of the invention is described below while referring to FIG. 1 to FIG. 4.

Figure 2:
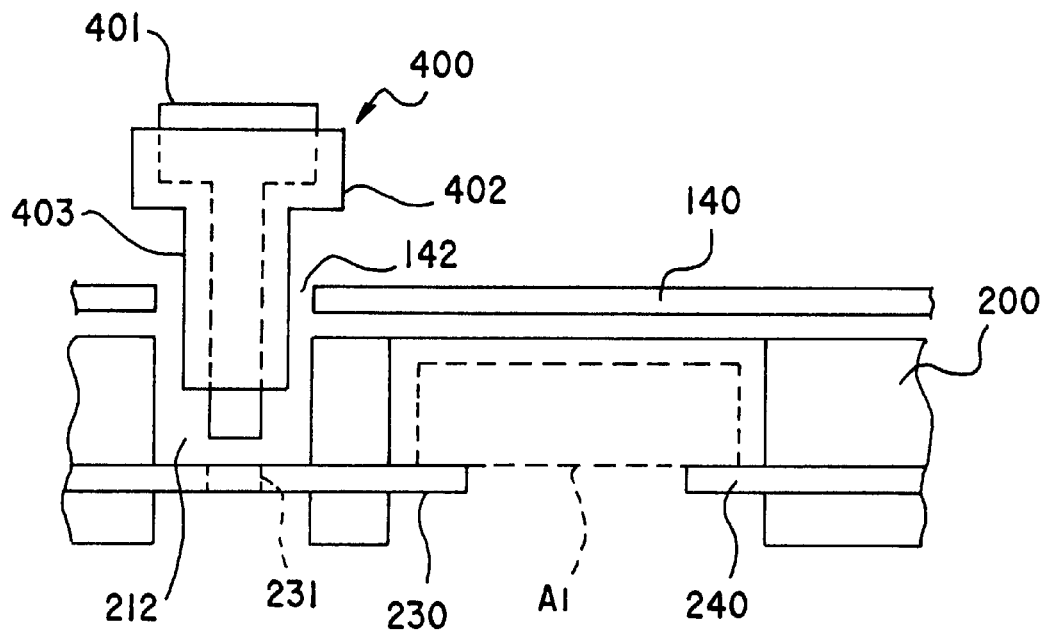
FIG. 2 is a schematic exploded perspective view for explaining the pressure-crush type protective device, output terminal, and its peripheral portion of the rechargeable battery using the pressure-crush type protective device according to the embodiment of the invention.
Figure 3:
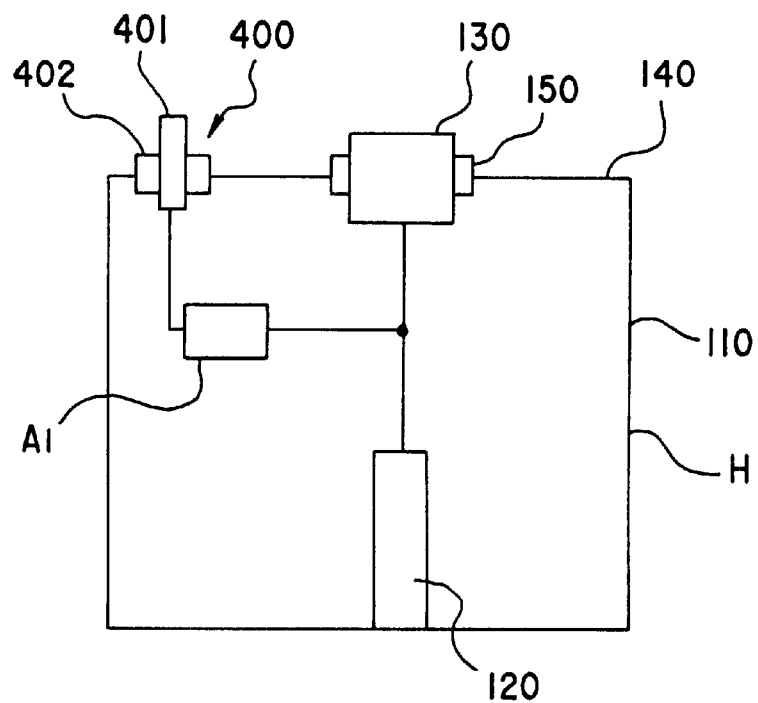
FIG. 3 is a schematic connection diagram for explaining the connection state of the pressure-crush type protective device of the rechargeable battery using the pressure-crush type protective device according to the embodiment of the invention.
Figure 4:
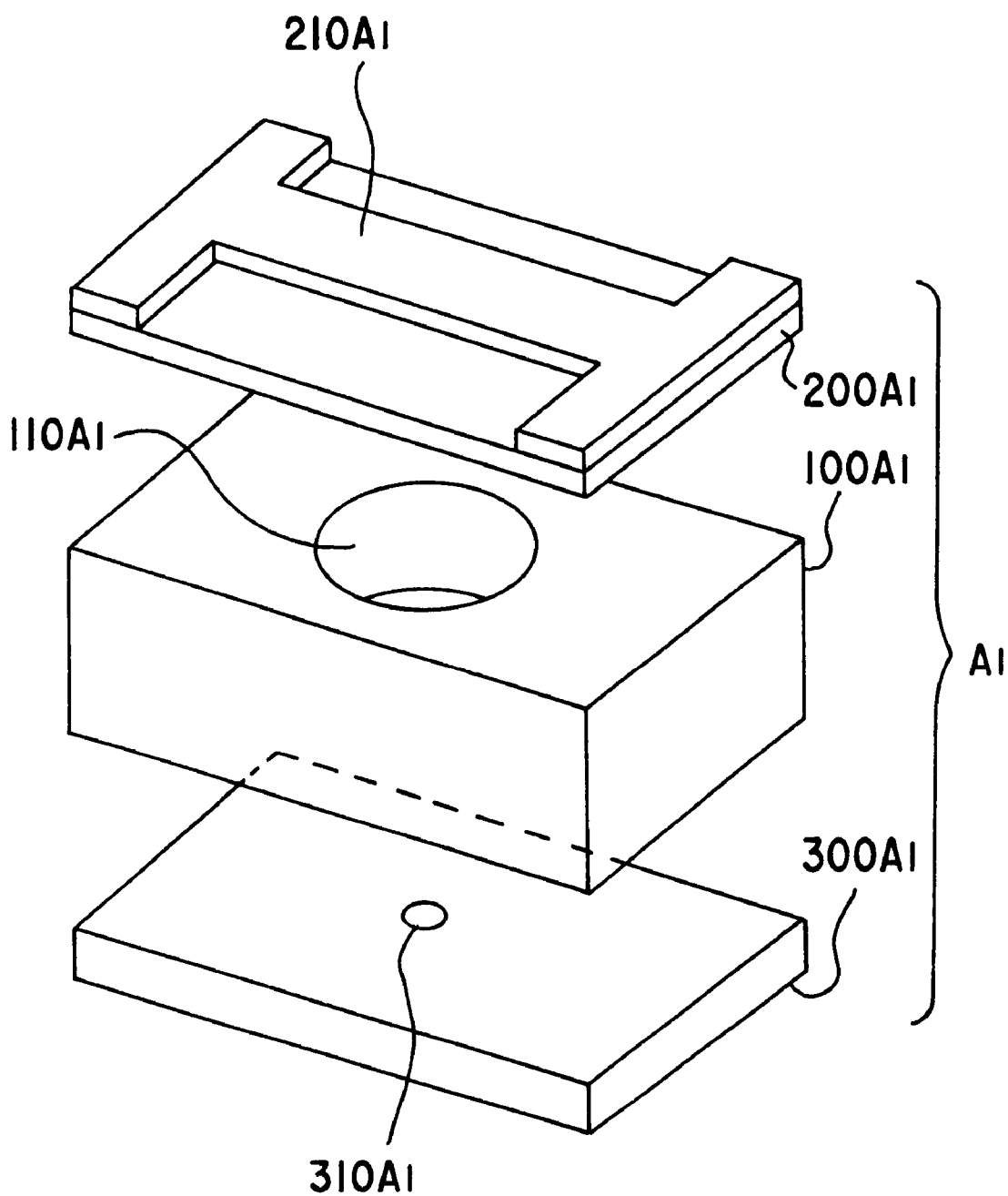
FIG. 4 is a schematic exploded perspective view of the pressure-crush type protective device used in the rechargeable battery using the pressure-crush type protective device according to the embodiment of the invention.

FIG. 1 is a schematic exploded perspective view of a rechargeable battery using a pressure-crush type protective device according to an embodiment of the invention, FIG. 2 is a schematic exploded perspective view for explaining the pressure-crush type protective device, output terminal, and its peripheral portion of the rechargeable battery using the pressure-crush type protective device according to the embodiment of the invention, FIG. 3 is a schematic connection diagram for explaining the connection state of the pressure-crush type protective device of the rechargeable battery using the pressure-crush type protective device according to the embodiment of the invention, and FIG. 4 is a schematic exploded perspective view of the pressure-crush type protective device used in the rechargeable battery using the pressure-crush type protective device according to the embodiment of the invention.

A rechargeable battery 100D1 using a pressure-crush type protective device according to an embodiment of the invention comprises an internal electrode plate 120 spirally wound about a positive electrode plate and a negative electrode plate through a separator, a housing H having a jacket 110 accommodating this internal electrode plate 120, a sealing body 140 for closing the opening of this jacket 110, a positive electrode (or negative electrode) output electrode 130 connected electrically to the internal electrode plate 120, a spacer 200 disposed beneath the sealing body 140 for insulating between the sealing body 140 and the internal electrode plate 120, a pressure-crush type protective device $A_1$ disposed in the spacer 200 as a pressure-sensitive element for detecting the internal pressure in the housing H, and an output terminal 400 connected electrically to one terminal (one side of a conductor layer $210A_1$) of this pressure-crush type protective device $A_1$ for taking out the detection result of the internal pressure detected by the pressure-crush type protective device $A_1$ electrically to outside, and other terminal (other end of the conductor layer $210A_1$) of the pressure-crush type protective device $A_1$ is connected electrically to the positive electrode (or negative electrode) output terminal 130.

The jacket 110 is made of metal, and serves also as negative electrode (or positive electrode), and the internal electrode plate 120 spirally wound about the positive electrode plate and negative electrode plate through the separator and electrolyte are contained in its inside.

The positive electrode (or negative electrode) output electrode 130 is used for pulling out the internal electrode plate 120 contained in the jacket 110 electrically to outside, and also for pulling out the other terminal of the pressure-crush type protective device $A_1$ electrically to outside, and a seal 150 made of insulating material such as plastic is formed around the positive electrode (or negative electrode) output electrode 130. The seal 150 is provided for insulating and closing the sealing body 140. From the lower end of the seal 150, a rivet 131 is protruding for connecting electrically with a terminal 240 described later to which the other terminal of the pressure-crush type protective device $A_1$ is connected. This rivet 131 is connected electrically to the terminal 240 as being crimped to the sealing body 140 and spacer 200, and also used for fixing the spacer 200 to the sealing body 140.

The sealing body 140 plays the role of a lid for sealing the jacket 110, and is fabricated into a dish form from metal plate by press forming or other method. The bottom of the dish-like recessed sealing body 140 is formed to contact tightly with the top surface of the spacer 200, and nearly half of the bottom is shallow in the sealing body 140 shown in FIG. 1. In the center of the sealing body 140, an opening 141 is formed for pulling out the positive electrode (or negative electrode) output electrode 130. Near the end of the shallow bottom side of the sealing body 140, an opening 142 is formed for fitting an output terminal 400. This opening 142 is formed in a size for inserting the portion following the small end 403 of the output terminal 400 mentioned below.

The spacer 200 is used for insulating between the sealing body 140 and internal electrode plate 120, and is made of insulating material such as plastic. The spacer 200 is fabricated to be put in the jacket 110 almost without gap, and the portion corresponding to the region of the shallow bottom of the sealing body 140 is formed in a thick wall. That is, the spacer 200 is provided beneath the sealing body 140, and is designed to be a nearly uniform thickness when combined with the sealing body 140. In the thick wall portion 210 of the spacer 200, a notch 211 is formed nearly in a rectangular parallelepiped as a space for placing the pressure-crush type protective device $A_1$. In the center of the spacer 200, an opening 220 larger than the opening 141 of the sealing body 140 is formed in the region corresponding to the opening 141 of the sealing body 140. Near one end of the spacer 200, an opening 212 of same size as the opening 142 of the sealing body 140 is provided in the region corresponding to the opening 142 of the sealing body 140.

The spacer 200 further includes two terminals 230, 240 made of conductive metal pieces, oppositely to each other in the notch 211. The two terminals 230, 240 are portions for electrically connecting the pressure-crush type protective device $A_1$. The pressure-crush type protective device $A_1$ is placed between leading end portions of the mutually opposite terminals 230, 240 in the notch 211, and connected electrically. The leading end portions of the terminals 230, 240 and right and left end portions of a conductor layer $210A_1$ mentioned below of the pressure-crush type protective device $A_1$ (that is, terminals of the pressure-crush type protective device $A_1$) are electrically connected. The size between the leading end portions of the terminals 230, 240 is limited so as not to reach the region immediately beneath a penetration hole $110A_1$ (see FIG. 4) mentioned below of the pressure-crush type protective device $A_1$.

The terminal 230 is also provided oppositely in the opening 212 of the spacer 200, and in the opening 212, there is a connection port 231 smaller than the opening 212. The terminal 230 is electrically connected to a rivet 401 described below of the output terminal 400 inserted into the connection port 231.

The terminal 240 is connected electrically to a connection piece 242 provided at the side of the spacer 200. The connection piece 242 is for connecting electrically to the internal electrode plate 120, that is, when assembling the rechargeable battery 100D1, the connection piece 242 and one end 160 of the internal electrode plate 120 are electrically connected. A support piece 243 for inserting is provided at the end of the connection piece 242.

The terminal 240 is also provided oppositely in the opening 220 of the spacer 200, and in this opening 220, a connection port 241 smaller than the opening 220 is provided. The terminal 240 is electrically connected to the rivet 131 of the positive electrode (or negative electrode) output terminal 130 inserted in the connection port 241.

The terminal 240 and connection piece 242 connected to the internal electrode plate 120 are formed integrally, and are provided in the spacer 200, together with the terminal 230, by insert forming.

The output terminal 400 is composed of the rivet 401 for pulling out one terminal of the pressure-crush type protective device $A_1$ electrically to outside, and a seal 402 provided in the circumference from near to the upper end to near the lower end of this rivet 401. The seal 402 is made of insulating material such as plastic, and is provided for keeping insulation and tightness with the sealing body 140. The portion of the seal 402 is formed of two stages of larger portion and smaller portion of the outside diameter of the seal 402. The base end portion of the seal 402 is the small end 403 of small outside diameter, and this small end 403 is the portion to be inserted into the opening 142 of the sealing body 140 and the upper side of the opening 212 of the spacer 200 (the upper side of the connection port 231 of the terminal 230). The lower side of the rivet 401 where the seal 402 is not provided is the portion to be inserted into the connection port 231 of the terminal 230. The rivet 401 is crimped by the sealing body 140 and spacer 200, and is electrically connected to the terminal 230, and also fixes the spacer 200 to the sealing body 140.

The pressure-crush type protective device $A_1$ comprises a main body $100A_1$ forming a penetration hole $110A_1$, a lid body $200A_1$ fitted to this main body $100A_1$ for closing the penetration hole $110A_1$, and a bottom body $300A_1$ fitted to the main body $100A_1$ at the opposite side of the lid body $200A_1$ for closing the penetration hole $110A_1$, and the lid body $200A_1$ has a conductor layer 210A which passes over the penetration hole $110A_1$ in a state being fitted to the main body $100A_1$. The right and left ends of the conductor layer $210A_1$ function as terminals of the pressure-crush type protective device $A_1$.

The main body $100A_1$ is composed of a nearly rectangular parallelepiped ceramic. The circular penetration hole $110A_1$ is opened from top to bottom of the main body $100A_1$. The penetration hole $110A_1$ is closed by the lid body $200A_1$ and bottom body $300A_1$.

The lid body $200A_1$ is a ceramic plate of the same size as the main body $100A_1$ in a plan view. At the upper side of the lid body $200A_1$, the conductor layer $210A_1$ is formed in the longitudinal direction of the lid body $200A_1$. The conductor layer $210A_1$ is formed at the position passing over the penetration hole $110A_1$ when the lid body $200A_1$ is fitted to the main body $100A_1$. The ends of the conductor layer $210A_1$ are formed wider than the central part. Since the ends of the conductor layer $210A_1$ (that is, terminals of the pressure-crush type protective device $A_1$) formed wider than the central part, it is easier to connect with the terminals 230, 240 as compared with the structure not formed wider.

The bottom body $300A_1$ is also a ceramic plate of the same size as the main body $100A_1$. The bottom body $300A_1$ has a small opening $310A_1$. This opening $310A_1$ is opened at a position for communicating between the penetration hole $110A_1$ and outside, facing the penetration hole $110A_1$, when the bottom body $300A_1$ is fitted to the main body $100A_1$. This opening $310A_1$ is preferred to be sufficiently smaller than the penetration hole $110A_1$.

It is required herein that the lid body $200A_1$ is formed more thinly than the main body $100A_1$ and bottom body $300A_1$. That is, when the internal pressure of the rechargeable battery 100D1 (that is, the internal pressure in the housing H) rises higher than the specified value, the entire portion just above the penetration hole $110A_1$ of the lid body $200A_1$ is broken, and the conductor layer $210A_1$ formed in the lid body $200A_1$ is cut, and the current flowing in the conductor layer $210A_1$ is cut off. For example, the lid body $200A_1$ may be formed very thinly, about 40 μm, by using a ceramic sheet. In FIG. 4, the main body $100A_1$ is thicker than the bottom body $300A_1$, but the main body $100A_1$ and bottom body $300A_1$ may be formed in a similar thickness.

The pressure-crush type protective device $A_1$ thus composed of main body $100A_1$, lid body $200A_1$ and bottom body $300A_1$ is manufactured in the following procedure.

The lid body $200A_1$ is adhered to the upper side of the main body $100A_1$, and the bottom body $300A_1$ to the lower side, and they are baked into one body. As a result, the penetration hole $110A_1$ of the main body $100A_1$ communicates with outside through the opening $310A_1$.

In this state, the opening $310A_1$ is filled with adhesive or the like, and the penetration hole $110A_1$ is formed as a space independent from the outside. Thus, the pressure-crush type protective device $A_1$ shown in FIG. 1 is completed.

The pressure-crush type protective device $A_1$ formed in this manner is designed so that the lid body $200A_1$ forming the conductor layer $210A_1$ is directly crushed by the internal pressure of the battery, without using breaking means, and a stable operation is assured and the reliability is high.

Besides, since the pressure-crush type protective device $A_1$ is provided in the notch 211 formed in the spacer 200, it does not require extra space for installing the pressure-crush type protective device $A_1$. Further, the structure of the pressure-crush type protective device $A_1$ is relatively simple, and the number of members is small, and hence it can be manufactured at low cost.

Figure 44A:
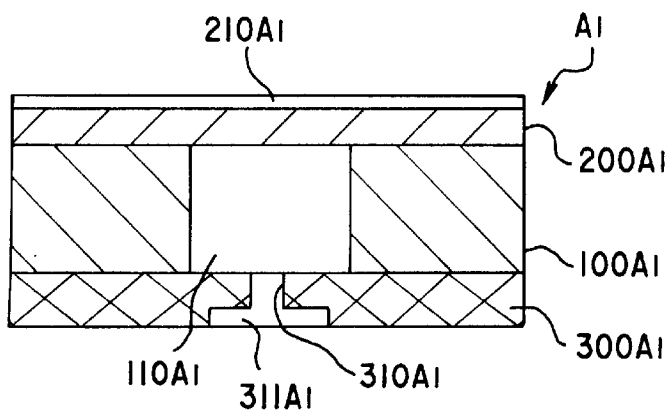
FIG. 44 is a schematic sectional view showing a further different embodiment of the pressure-crush type protective device according to the invention.

The opening $310A_1$ is sealed with adhesive, but, as shown in FIG. 44(A), a recess $311A_1$ may be formed at the back side of the bottom body $300A_1$ so as to enclose the opening $310A_1$. Further, the opening $310A_1$ and recess $311A_1$ may be formed on different ceramic seats. This recess $311A_1$ is filled with adhesive to seal the opening $310A_1$, and therefore the adhesive is not built up at the back side of the bottom plate $300A_1$, and the pressure-crush type protective device $A_1$ can be mounted flatly, so that there is no risk of breakage of adhesive and the bottom plate $300A_1$ by external force. Incidentally, the adhesive for sealing the opening $310A_1$ causes runs when the viscosity is low or is poor in wetting when the viscosity is high, and the control of viscosity is an important point, but by filling the recess $311A_1$, it is free from problems of runs and wetting, and the opening $310A_1$ can be sealed securely.

The assembling method of the rechargeable battery 100D1 is explained below.

In the shallow bottom region of the sealing body 140, the thick wall portion 210 of the spacer 200 is matched, and the spacer 200 is overlaid on the lower side of the sealing body 140. The positive electrode (or negative electrode) output electrode 130 is inserted into the opening 141 of the sealing body 140 and the opening 220 of the spacer 200, the rivet 131 of the positive electrode (or negative electrode) output electrode 130 is crimped, and the rivet 131 is connected electrically with the terminal 240 at the backside of the spacer 200.

Inserting the output terminal 400 into the opening 142 of the sealing body 140 and the opening 212 of the spacer 200, the rivet 401 of the output terminal 400 is crimped, and the rivet 401 is connected electrically with the terminal 230 at the back side of the spacer 200.

The pressure-crush type protective device $A_1$ is mounted on the leading ends of the terminals 230, 240 so that the both right and left ends of the conductor layer $210A_1$ of the pressure-crush type protective device $A_1$ (that is, the terminals of the pressure-crush type protective device $A_1$) may contact with the leading ends of the terminals 230, 240, and the terminals 230, 240 are connected to both right and left ends of the conductor layer $210A_1$ by soldering or ultrasonic fusion.

While keeping electric connection between the connection piece 242 connected electrically to the positive electrode (or negative electrode) output electrode 130 through the terminal 240 and one end 160 of the internal electrode plate 120, and keeping insulation against the jacket 110 through the insulating film 160, the sealing body 140 integrated with the spacer 200 is fitted into the opening 111 of the jacket 110. Finally, the periphery of the sealing body 140 is fitted air-tightly to the jacket 110 by laser welding or the like, so that the rechargeable battery 100D1 is obtained.

The rechargeable battery 100D1 incorporates the pressure-crush type protective device $A_1$ as a pressure-sensitive element. The detection result of internal pressure of the rechargeable battery 100D1 by the pressure-crush type protective device $A_1$ is electrically picked up as follows by the output terminal 400 and positive electrode (or negative electrode) output electrode 130.

As far as the rechargeable battery 100D1 is normal, that is, while the internal pressure of the rechargeable battery 100D1 is lower than the specified value, the output terminal 400 and the positive electrode (or negative electrode) output electrode 130 are nearly at the same potential. This is because, in this state, the lid body 200A$_1$ of the pressure-crush type protective device A$_1$ is not crushed, and the conductor layer 210A$_1$ of the lid body 200A$_1$ is not broken, so that the conductive state of the conductor layer 210A$_1$ is maintained.

On the other hand, when the rechargeable battery 100D1 is abnormal, that is, when the internal pressure of the rechargeable battery 100D1 is higher than the specified value, the positive electrode (or negative electrode) output electrode 130 remains at the same potential, but the potential of the output terminal 400 is a different potential (usually about 0 V) from the potential of the positive electrode (or negative electrode) output electrode 130. This is because, at this time, the lid body 200A$_1$ of the pressure-crush type protective device A$_1$ is crushed, and the conductor layer 210A$_1$ of the lid body 200A$_1$ is broken, so that the both ends of the conductor layer 210A$_1$ are in an electrically open state.

Thus, the rechargeable battery 100D1 picks up changes of the potential of the output terminal 400 before and after elevation of the internal pressure of the rechargeable battery 100D1 from the specified value.

A portable electronic device having this rechargeable battery 100D1 is designed to make use of such changes.

The portable electronic device having the rechargeable battery 100D1, that is, the portable electronic device according to the embodiment of the invention (hereinafter called portable electronic device K1) is composed as follows.

The portable electronic device K1 (not shown) comprises a controller, a cut-off circuit controlled by this controller, other functional circuits, and the rechargeable battery 100D1 as the power source thereof.

The cut-off circuit is disposed among the controller, other functional circuits, and rechargeable battery 100D1.

The controller is, for example, a microcomputer, and has an input port to be connected to the output terminal 400. The controller detects the potential of the output terminal 400 entered in the input port, and judges if the internal pressure of the rechargeable battery 100D1 is higher than the specified value or not, and if higher than the specified value, the cut-off circuit is put in action.

When the rechargeable battery 100D1 provided in the portable electronic device is overcharged or short-circuited, and the internal pressure of the rechargeable battery 100D1 rises higher than the specified value, the cut-off circuit functions, and explosion of the rechargeable battery 100D1 can be prevented. Therefore, the portable electronic device of higher safety can be presented.

In the rechargeable battery 100D1, the output terminal 400 is provided in the sealing body 140 of the housing H, but, instead, it may be also provided in the jacket 110.

The rechargeable battery is used in a pressure-crush type protective device in other embodiment of the invention as rechargeable battery 100D2, and only the different points are explained below by referring to FIG. 5 and FIG. 6.

Figure 5:
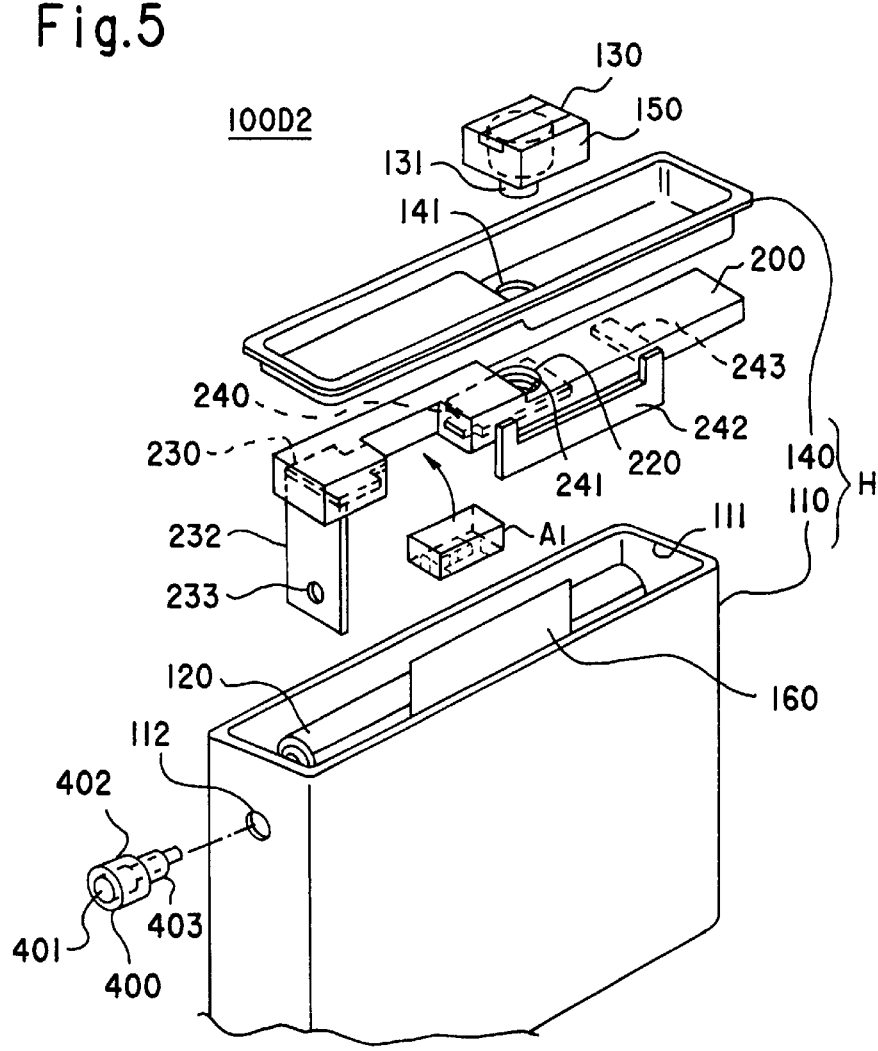
FIG. 5 is a schematic exploded perspective view of a rechargeable battery using a pressure-crush type protective device according to other embodiment of the invention.
Figure 6:
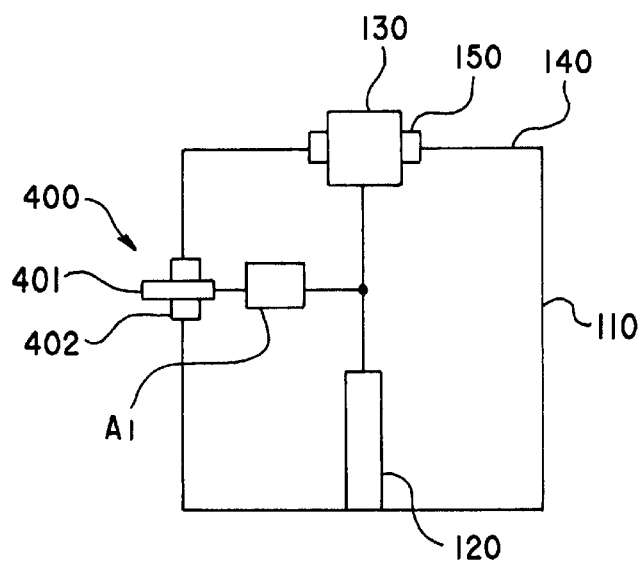
FIG. 6 is a schematic connection diagram for explaining the connection state of the pressure-crush type protective device of the rechargeable battery using the pressure-crush type protective device according to other embodiment of the invention.

FIG. 5 is a schematic exploded perspective view of a rechargeable battery using a pressure-crush type protective device according to other embodiment of the invention, and FIG. 6 is a schematic connection diagram for explaining the connection state of the pressure-crush type protective device of the rechargeable battery using the pressure-crush type protective device according to other embodiment of the invention.

In the rechargeable battery 100D2, the opening 142 of the sealing body 140, the opening 212 of the spacer 200, and the connection port 231 of the terminal 230 provided in the rechargeable battery 100D1 are not required.

Instead, a junction 232 is electrically connected to the terminal 230, and an opening 112 for fitting the output terminal 400 is provided at the upper side of the side of the jacket 110.

The junction 232 is a flexible substrate formed longer than the distance between the terminal 230 and opening 112 in assembled state for the convenience of assembling. At the end side of the junction 232, a connection port 233 is opened for inserting the lower end side of the rivet 401 of the output terminal 400. The junction 232 is formed by exposing the conductive portion only in the crimping range of the rivet 401 and the base end portion of the junction 232, in the periphery of the connection port 233. The base end portion of the junction 232 is connected to the lower side of the terminal 230 by soldering or other means.

The opening 112 of the jacket 110 is formed in a size for inserting the portion following the small end 403 of the output terminal 400.

All other respects are same as in the rechargeable battery 100D1, but the assembling method of the rechargeable battery 100D2 is changed as described below.

In the shallow bottom region of the sealing body 140, the thick wall portion 210 of the spacer 200 is matched, and the spacer 200 is overlaid on the lower side of the sealing body 140. The positive electrode (or negative electrode) output electrode 130 is inserted into the opening 141 of the sealing body 140 and the opening 220 of the spacer 200, the rivet 131 of the positive electrode (or negative electrode) output electrode 130 is crimped, and the rivet 131 is connected electrically with the terminal 240 at the backside of the spacer 200.

In order that the both right and left ends of the conductor layer 210A$_1$ of the pressure-crush type protective device A$_1$ may contact with the leading ends of the terminals 230, 240, the pressure-crush type protective device A$_1$ is mounted on the leading ends of the terminals 230, 240, and the terminals 230, 240 are connected to both right and left ends of the conductor layer 2310A$_1$ by soldering or ultrasonic fusion.

The rivet 401 is inserted into the opening 112 at the side of the jacket 110 and the connection port 233 at the junction 232, the rivet 401 of the output terminal 400 is crimped, and the rivet 401 is electrically connected to the junction 232.

While keeping electric connection between the connection piece 242 connected electrically to the positive electrode (or negative electrode) output electrode 130 through the terminal 240 and one end 160 of the internal electrode plate 120, and keeping insulation against the jacket 110 through the insulating film 160, the sealing body 140 integrated with the spacer 200 is fitted into the opening 111 of the jacket 110. Finally, the periphery of the sealing body 140 is fitted air-tightly to the jacket 110 by laser welding or the like, so that the rechargeable battery 100D2 is obtained.

The rechargeable battery 100D2, same as the rechargeable battery 100D1, is used in the portable electronic device.

Thus, in the rechargeable batteries 100D1, 100D2, the other terminal of the pressure-crush type protective device $A_1$ is connected electrically to the positive electrode (or negative electrode) output electrode 130, but, instead, the other terminal of the pressure-crush type protective device $A_1$ may be connected electrically to a newly added output terminal 400.

The rechargeable battery is used in a pressure-crush type protective device in another embodiment of the invention as rechargeable battery 100D3, and only the different points are explained below by referring to FIG. 7 and FIG. 8.

Figure 7:
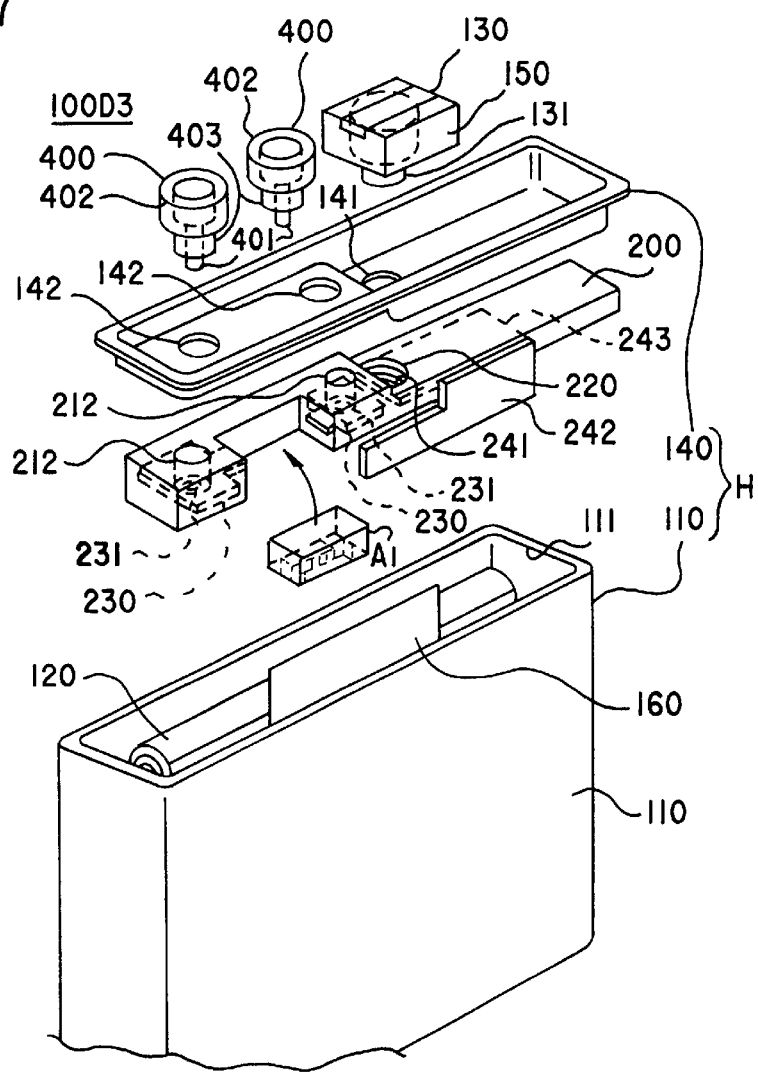
FIG. 7 is a schematic exploded perspective view of a rechargeable battery using a pressure-crush type protective device according to another embodiment of the invention.
Figure 8:
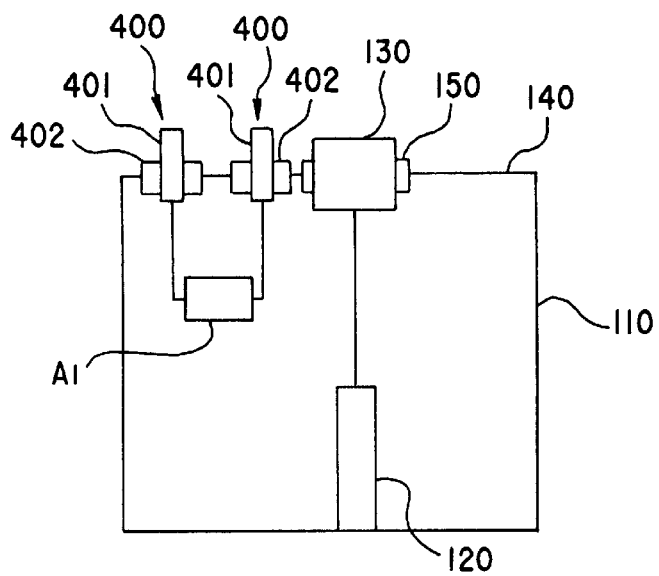
FIG. 8 is a schematic connection diagram for explaining the connection state of the pressure-crush type protective device of the rechargeable battery using the pressure-crush type protective device according to another embodiment of the invention.

FIG. 7 is a schematic exploded perspective view of a rechargeable battery using a pressure-crush type protective device according to another embodiment of the invention, and FIG. 8 is a schematic connection diagram for explaining the connection state of the pressure-crush type protective device of the rechargeable battery using the pressure-crush type protective device according to another embodiment of the invention.

(1) In the rechargeable battery 100D1, only one output terminal 400 is provided in the sealing body 140, but in the rechargeable battery 100D3, together with a newly added output terminal 400, two output terminals 400 are provided in the sealing body 140.

(2) In the rechargeable battery 100D3, for the sake of the newly added output terminal 400, one more new opening 142 is formed in the shallow bottom portion of the sealing body 140. This opening 142 is formed in a size for inserting the portion following the small end 403 of the output terminal 400.

(3) In the rechargeable battery 100D1, the spacer 200 has two terminals 230, 240 made of conductive metal pieces formed face to face in the notch 211, and in the rechargeable battery 100D3, the two terminals 230, 230 are formed symmetrically in the notch 211. Similarly, the openings 212 of the spacer 200 are also formed symmetrically.

In the rechargeable battery 100D1, the terminal 240 and connection piece 242 are integral, but in the rechargeable battery 100D3, the terminal 230 modified from the terminal 240 are separate from the connection piece 242, and are not connected electrically. In the rechargeable battery 100D3, the size of the support piece 243 for inserting the connection piece 242 is large, and the connection port 241 provided in the terminal 240 in the rechargeable battery 100D1 is incorporated therein. In the rechargeable battery 100D3, too, the connection piece 242 connected to the internal electrode 120, and the terminals 230, 230 are provided in the spacer 200 by insert forming.

The assembling method of this rechargeable battery 100D3 is nearly same as in the rechargeable battery 100D1, and only the output terminal 400 is changed from one to two, and the description is omitted.

The portable electronic device having this rechargeable battery 100D3 (hereinafter called portable electronic device K2) differs from the portable electronic device K1 in the following points.

(1) The controller has one Output Port.

(2) The input port of the controller is connected to one of the two output terminals 400 of the rechargeable battery 100D3, and the output port is connected to the other output terminal 400. The controller delivers, for example, specified current from the output port. That is, depending on whether the specified current from the output port is entered in the input port or not, through the pressure-crush type protective device $A_1$ connected to the two output terminals 400, the controller judges whether the internal pressure in the rechargeable battery 100D3 has exceeded the specified value or not. Therefore, when the specified current is not entered in the input port, the controller actuates the cut-off circuit.

In this way, when the rechargeable battery 100D3 provided in the portable electronic device is overcharged or short-circuited and the internal pressure in the rechargeable battery 100D3 rises higher than the specified value, the cut-off circuit is actuated, so that explosion of the rechargeable battery 100D3 can be prevented. Hence, the portable electronic device of higher safety can be presented.

In the rechargeable battery 100D1, the other terminal of the pressure-crush type protective device $A_1$ is connected electrically to the positive electrode (or negative electrode) output electrode 130, but, instead of the positive electrode (or negative electrode) output electrode 130, it may be also connected to the opposite electrode side, that is, the jacket 110 or the sealing body 140 connected electrically thereto. Although not shown in the drawing, for example, one of the two output terminals 400 in the rechargeable battery 100D3 may be used for connection with the sealing body 140, instead of the output terminal. That is, one of the two output terminals 400 maybe fitted air-tightly to the sealing body 140 by laser welding or the like without using sealing part 402.

The rechargeable battery having such structure functions same as the rechargeable battery 100D1.

In the foregoing explanations, the pressure-crush type protective device $A_1$ is used, but the pressure-crush type protective device is not limited to this alone, but may include modified examples of the pressure-crush type protective device $A_1$, such as pressure-crush type protective devices $A_2$ to $A_5$, which are explained by reference to FIG. 9 to FIG. 13. In these pressure-crush type protective devices $A_2$ to $A_5$, same as in the pressure-crush type protective device $A_1$, the right and left ends of the conductor layer function as terminals of each pressure-crush type protective device.

Figure 9:
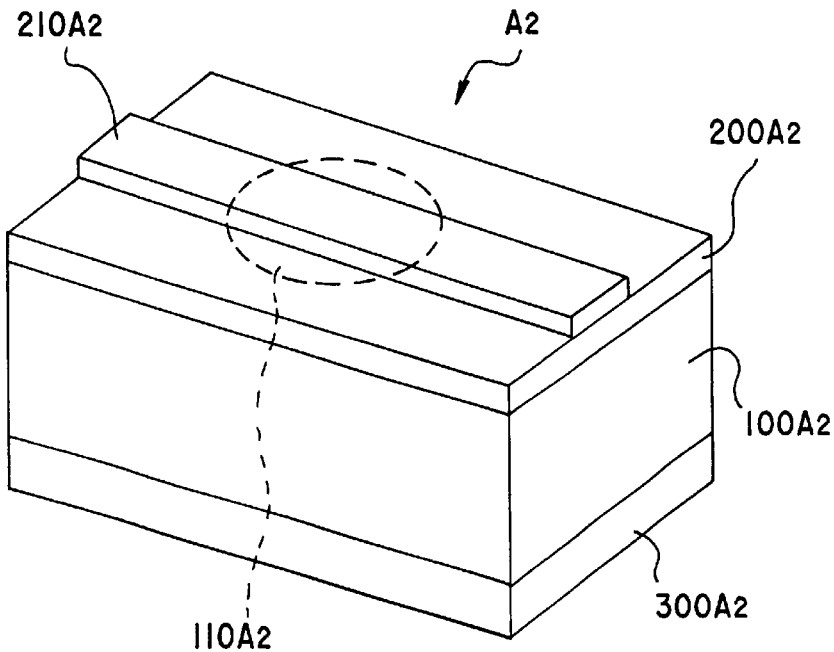
FIG. 9 is a schematic perspective view showing a modified example of the pressure-crush type protective device used in the rechargeable battery using the pressure-crush type protective device according to the embodiment of the invention.
Figure 10:
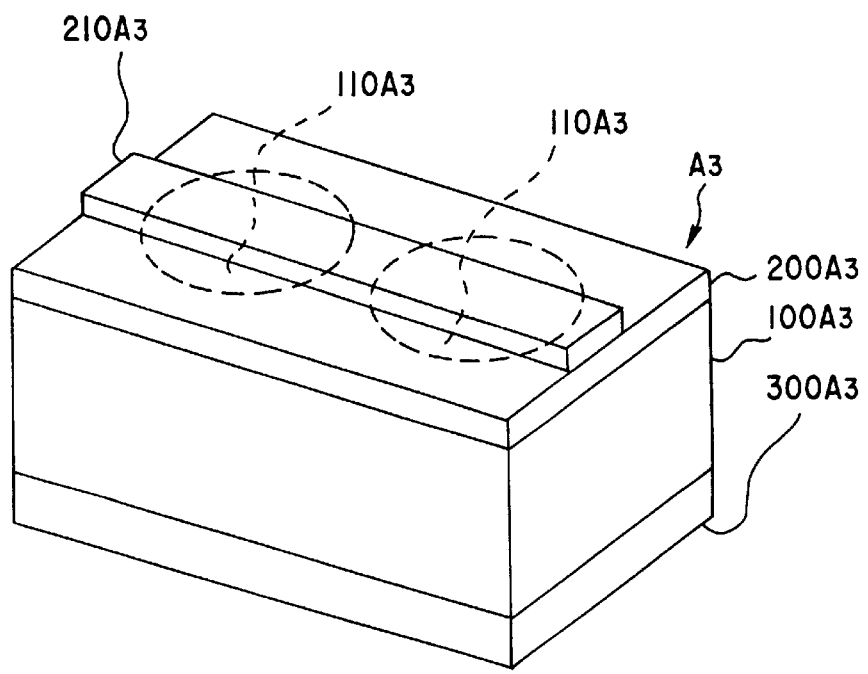
FIG. 10 is a schematic perspective view showing other modified example of the pressure-crush type protective device used in the rechargeable battery using the pressure-crush type protective device according to the embodiment of the invention.
Figure 11:
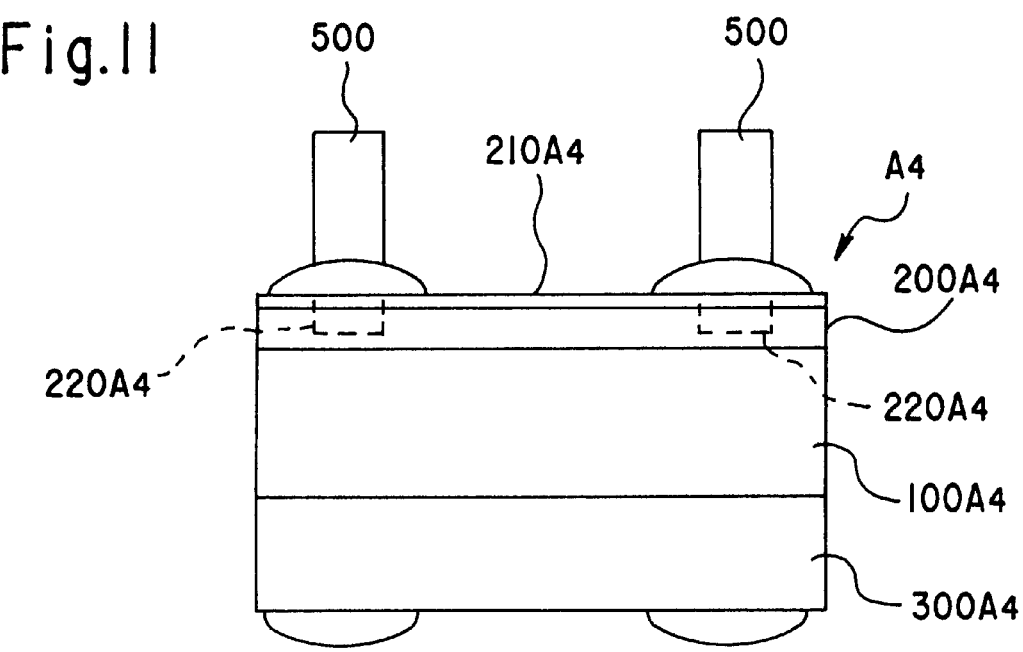
FIG. 11 is a schematic front view showing other modified example of the pressure-crush type protective device used in the rechargeable battery using the pressure-crush type protective device according to the embodiment of the invention.
Figure 12:
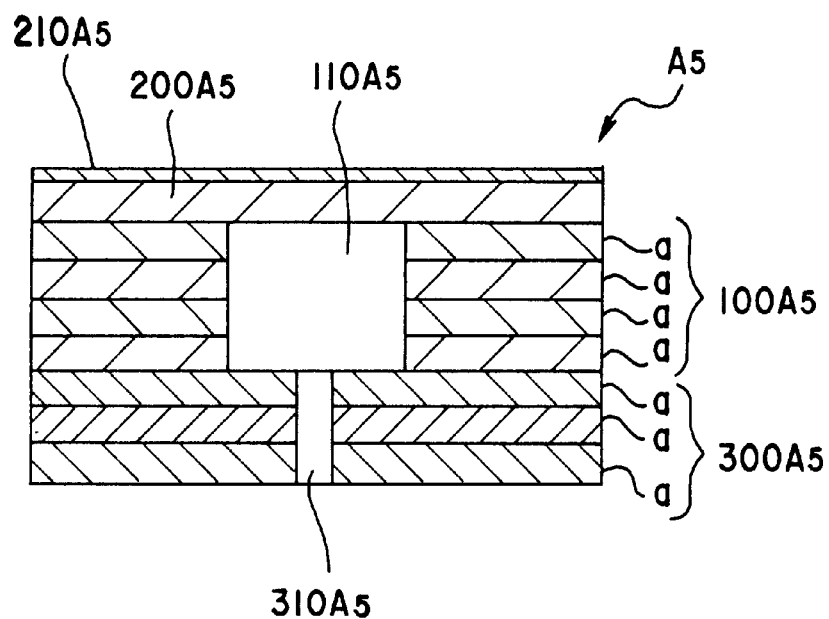
FIG. 12 is a schematic sectional view showing other modified example of the pressure-crush type protective device used in the rechargeable battery using the pressure-crush type protective device according to the embodiment of the invention.
Figure 13:
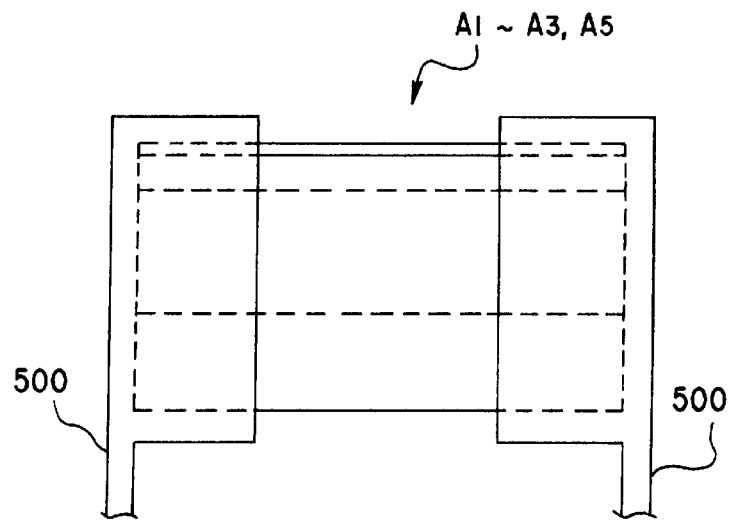
FIG. 13 is a schematic front view showing an example of the connection state of the pressure-crush type protective device of FIGS. 4, 9, 10, or 12 used the rechargeable battery using the pressure-crush type protective device according to the embodiment of the invention.

FIG. 9 is a schematic perspective view showing a modified example of the pressure-crush type protective device used in the rechargeable battery using the pressure-crush type protective device according to the embodiment of the invention, FIG. 10 is a schematic perspective view showing other modified example of the pressure-crush type protective device used in the rechargeable battery using the pressure-crush type protective device according to the embodiment of the invention, FIG. 11 is a schematic front view showing other modified example of the pressure-crush type protective device used in the rechargeable battery using the pressure-crush type protective device according to the embodiment of the invention, FIG. 12 is a schematic sectional view showing other modified example of the pressure-crush type protective device used in the rechargeable battery using the pressure-crush type protective device according to the embodiment of the invention, and FIG. 13 is a schematic front view showing an example of the connection state of the pressure-crush type protective device of FIGS. 4, 9, 10, or 12 used the rechargeable battery using the pressure-crush type protective device according to the embodiment of the invention.

In the pressure-crush type protective device $A_2$ shown in FIG. 9, only the conductor layer 210A$_2$ formed in the longitudinal direction of the lid body 200A$_2$ is different from the conductor layer 210A$_1$ of the pressure-crush type protective device $A_1$ (see FIG. 4). In the pressure-crush type protective device $A_1$, the end of the conductor layer 210A$_1$ is formed wider than the central part, whereas in the conductor layer 210A$_1$ of the pressure-crush type protective device $A_2$, the end is formed in the same width as the central part (the same width as the central part of the conductor layer $210A_1$). As far as the width of the leading end of the terminal 230 of the rechargeable battery 100D1 or the like is narrow, the width of the conductor layer $210A_2$ of the pressure-crush type protective device $A_2$ is enough. Besides, same as mentioned above, the conductor layer $210A_2$ passes the upper side of the penetration hole $110A_2$ formed in the main body $100A_2$.

In these pressure-crush type protective devices $A_1$ and $A_2$, the main body $100A_1$, $100A_2$ has one penetration hole each $110A_1$, $110A_2$, but two penetration holes $100A_3$ may be opened as shown in the pressure-crush type protective device $A_3$ in FIG. 10. Thus, when a plurality of penetration holes $110A_3$ are opened, the conduction is cut off when the conductor layer $210A_3$ formed to be positioned on each penetration hole $110A_3$ is broken, so that the reliability may be enhanced. Other components, such as lid body $200A_3$ and bottom body $300A_3$ are same as in the foregoing pressure-crush type protective device $A_2$ (or $A_1$), and detailed description is omitted.

In the pressure-crush type protective device $A_4$ shown in FIG. 11, the terminal 500 (equivalent to the leading end side of the terminal 230 of the rechargeable battery 100D1 or the like being folded and bent vertically) is connected vertically to the conductor layer $210A_4$. Accordingly, in the pressure-crush type protective device $A_4$, the lid body $200A_4$ has a recess $220A_4$ penetrating through the conductor layer $210A_4$, at both ends of the conductor layer $210A_4$, and the terminal 500 is inserted into the recess $220A_4$ from the vertical direction, and fixed by soldering, adhering or tightening.

In these pressure-crush type protective devices $A_1$ to $A_4$, not only the lid bodies $200A_1$, $200A_2$, $200A_3$, $200A_4$, but also the main bodies $100A_1$, $100 A_2$, $100A_3$, $100A_4$, and bottom bodies $300A_1$, $300A_2$, $300A_3$, $300A_4$ are composed of one layer of ceramics. However, as in the pressure-crush type protective device $A_5$ shown in FIG. 12, the main body $100A_5$ and bottom body $300A_5$ may be composed by laminating plural (four and three, respectively, in the drawing) thin ceramic sheets (a). When the main body $100A_5$ and others are composed by laminating ceramic sheets (a), the main body $100A_5$ and others may be formed in a desired size, in particular, thickness, depending on the requirement. In this case, the laminated ceramic sheets (a) may be thinner than the lid body $200A_5$.

In this case, the notch for penetration hole $110A_5$ and the notch for opening $310A_5$ must be formed in the ceramic sheets (a).

Figure 44B:
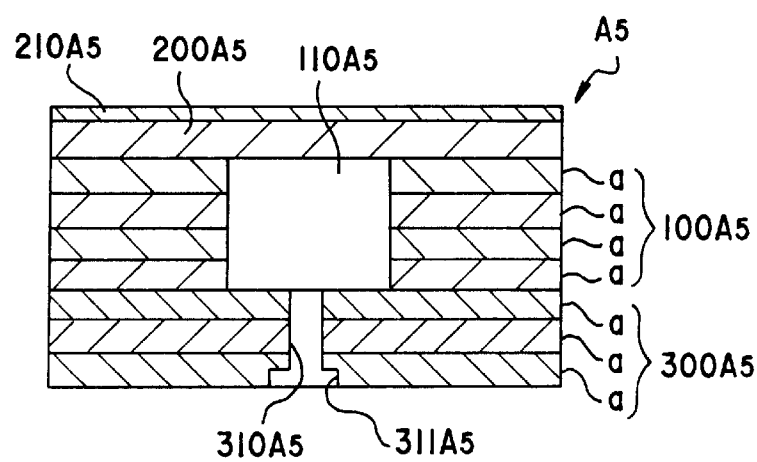

In this opening $310A_5$, a recess $311A_5$ may be formed, as shown in FIG. 44(B), in the ceramic sheet (a) at the ultimate back side of the bottom body $300A_5$. Further, the opening $310A_5$ and recess $311A_5$ may be formed on different ceramic seats. This recess $311A_5$ is filled with adhesive, and the opening $310A_5$ is sealed, so that the adhesive is not built up at the back side of the bottom plate $300A_5$, and the pressure-crush type protective device $A_5$ is mounted flatly, and risk of breakage of adhesive and the bottom plate $300A_5$ by external force is lowered. Incidentally, the adhesive for sealing the opening $310A_5$ causes runs when the viscosity is low or is poor in wetting when the viscosity is high, and the control of viscosity is an important point, but by filling the recess $311A_5$, it is free from problems of runs and wetting, and the opening $310A_5$ can be sealed securely.

The pressure-crush type protective devices $A_1$ to $A_3$, and $A_5$ may be connected, as shown in FIG. 13, by fitting both ends into the box-shaped terminal 500 (the leading end side of the terminal 230 of the rechargeable battery 100D1 or the like being formed into a box-shaped terminal).

Figure 14:
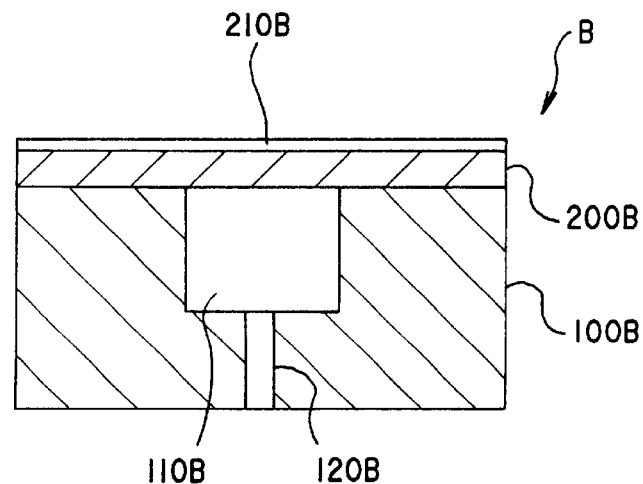
FIG. 14 is a schematic sectional view showing other modified example of the pressure-crush type protective device used in the rechargeable battery using the pressure-crush type protective device according to the embodiment of the invention.

Considerably different from the pressure-crush type protective devices $A_1$ to $A_3$, and $A_5$ in structure, a pressure-crush type protective device B used in the rechargeable battery using the pressure-crush type protective device relating to an embodiment of the invention instead of them is described while referring to FIG. 14. In the pressure-crush type protective device B, too, same as in the pressure-crush type protective device $A_1$, the right and left ends of the conductor layer function as terminals of the pressure-crush type protective device.

FIG. 14 is a schematic sectional view showing other modified example of the pressure-crush type protective device used in the rechargeable battery using the pressure-crush type protective device according to the embodiment of the invention.

What the pressure-crush type protective device B differs from the foregoing pressure-crush type protective devices $A_1$ to $A_5$ lies in that it is composed of two parts whereas the pressure-crush type protective devices $A_1$ to $A_5$ are composed of three parts, that is, the main body $100A_1$, $100A_2$, $100A_3$, $100A_4$, the lid body $200A_1$, $200A_2$, $20GA_3$, $200A_4$, and the bottom body $300A_1$, $300A_2$, $300A_3$, $300A_4$.

The pressure-crush type protective device B comprises, as shown in FIG. 14, a main body 100B forming a recess 110B, and a lid body 200B fitted to the main body 100B for closing the recess 110B, and in the lid body 200B, a conductor layer 210B (same as the conductor layer $210A_2$) for passing above the recess 110B in a state fitted to the main body 100B.

The main body 100B is composed of a nearly rectangular parallelepiped ceramic material. The main body 100B has a circular recess 110B formed from top to bottom. Therefore, the main body 100B is formed nearly in a box shape. Moreover, the recess 110B has an opening 120B for communicating between the recess 110B and the outside, opened at the different side of the fitting side of the lid body 200B, that is, the lower side.

On the other hand, the lid body 200B is a ceramic plate of the same size as the main body 100B in plan view. At the upper side of the lid body 200B, a conductor layer 210B is formed in the longitudinal direction of the lid body 200B. The conductor layer 210B is disposed at a position of passing above the recess 110B when the lid body 200B is fitted to the main body 100B.

The lid body 200B is formed more thinly than the main body 100B. That is, when the internal pressure of the rechargeable battery rises higher than the specified value, the portion just above the recess 110B of the lid body 200B is broken, and the conductor layer 210B formed in the lid body 200B is cut, and the current flowing in the conductor layer 210B is cut off. For example, the lid body 200B may be formed very thinly, about 40 $\mu$m. by using a ceramic sheet.

Figure 44C:
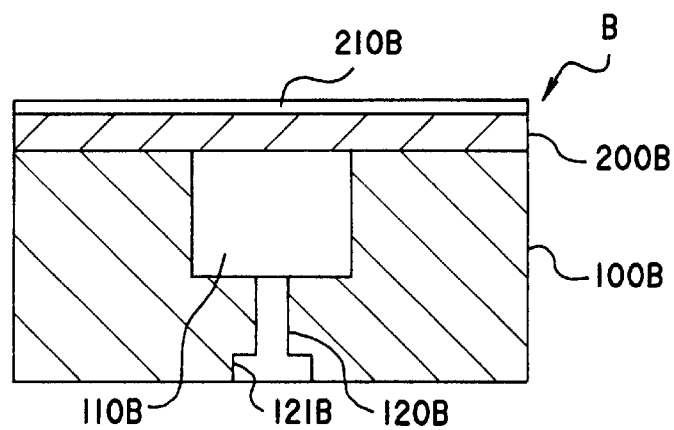

The opening 120B is sealed with adhesive or the like, but, as shown in FIG. 44(C), a recess 121B may be formed at the back side of the main body 100B so as to surround the opening 120B. Further, the opening 120B and recess 121B may be formed on different ceramic seats. This recess 121B is filled with adhesive, and the opening 120B is sealed, so that the adhesive is not built up at the back side of the main body 100B, and the pressure-crush type protective device B is mounted flatly, and risk of breakage of adhesive and the main body 100B by external force is lowered. Incidentally, the adhesive for sealing the opening 120B causes runs when the viscosity is low or is poor in wetting when the viscosity is high, and the control of viscosity is an important point, but by filling the recess 121B, it is free from problems of runs and wetting, and the opening 120B can be sealed securely.

The assembling method of the rechargeable battery 100D1 is described below.

The pressure-crush type protective device B composed of the main body 100A and lid body 20GB is manufactured in the following manner.

First, the lid body 200B is adhered to the upper side of the main body 10GB, and is baked into one body. As a result, the recess 110B of the main body 100B communicates with outside through the opening 120B.

In this state, the opening 120B is sealed with adhesive or the like, and the recess 110B is formed as a space isolated from outside. Thus, the pressure-crush type protective device B is completed.

The pressure-crush type protective device B constructed in this manner may be modified in the following examples.

Same as in the pressure-crush type protective device $A_1$, the end of the conductor layer is formed wider than the central part. In this type, it is easier to connect to the conductor layer of the terminal.

Like the pressure-crush type protective device $A_3$ having two penetration holes $110A_3$, two recesses may be formed in the main body. By forming plural recesses, since the conduction is cut off when the conductor layer positioned above any recess is broken, the reliability is further enhanced.

Further, same as in the pressure-crush type protective device $A_4$, in order that the terminal of the rechargeable battery 100D1 or the like may be connected vertically to the conductor layer, a recess penetrating through the conductor layer may be formed at both ends of the conductor layer of the lid body. Thus, various mounting patterns of the pressure-crush type protective device may be obtained.

Figure 15:
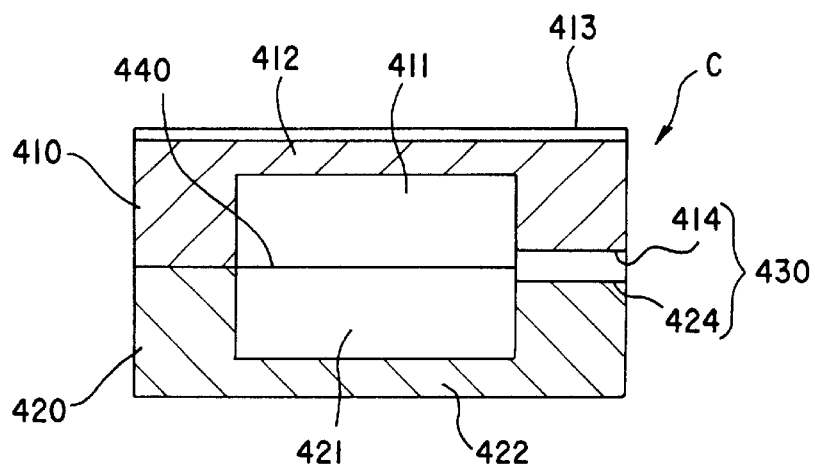
FIG. 15 is a schematic sectional view showing other modified example of the pressure-crush type protective device used in the rechargeable battery using the pressure-crush type protective device according to the embodiment of the invention.

Considerably different from the pressure-crush type protective devices $A_1$ to $A_5$, and B in structure, a pressure-crush type protective device C used in the rechargeable battery using the pressure-crush type protective device relating to an embodiment of the invention instead of them is described while referring to FIG. 15. In the pressure-crush type protective device C, too, same as in the pressure-crush type protective device $A_1$, the right and left ends of the conductor layer function as terminals of the pressure-crush type protective device.

FIG. 15 is a schematic sectional view showing other modified example of the pressure-crush type protective device used in the rechargeable battery using the pressure-crush type protective device according to the embodiment of the invention.

The pressure-crush type protective device C comprises a first main body 410 forming a recess 411, and a second main body 420 forming a recess 421, in which the bottom 412 of the recess 411 of the first main body 410 is formed more thinly than the bottom 422 of the recess 421 of the second main body 420, a conductor layer 413 is formed in the portion corresponding to the bottom 412 of the recess 411, at the back side of the first main body 410, and when the both main bodies 410, 420 are combined with the recesses 411, 421 face to face, a space 440 formed by the both recesses 411, 421, and a communicating part 430 for communicating with outside are formed between the both main bodies 410, 420.

The first main body 410 is composed of a nearly rectangular parallelepiped ceramic material. The first main body 410 has a circular recess 411 formed from top to bottom. Therefore, the first main body 410 is formed nearly in a box shape. At the upper edge of the recess 411, a recess groove 414 is formed as a communication path 430.

At the back side of the first main body 410, and in the portion corresponding to the bottom 412 of the recess 411, a conductor layer 413 is formed. The conductor layer 413 passes above the recess 411.

On the other hand, the second main body 420 is, same as the first main body 410, composed of a nearly rectangular parallelepiped ceramic material. The second main body 420 has a circular recess 421 formed from top to bottom. Therefore, the second main body 420 is formed nearly in a box shape. At the upper edge of the recess 421, a recess groove 424 is formed as a communication path 430.

However, what the second main body 420 differs from the first man body 410 lies in the thickness of the bottom 422 of the recess 421. That is, the bottom 422 of the recess 421 of the second main body 420 is thicker than the bottom 412 of the recess 411 of the first main body 410. Therefore, the bottom 411 is broken easier than the bottom 422.

When the first main body 410 and second main body 420 are combined with the recesses 411, 421 face to face, a space 440 is formed between the both recesses 411, 421. This space 440 communicates with outside through a communicating path 430 formed by the recess grooves 414, 424.

Figure 44D:
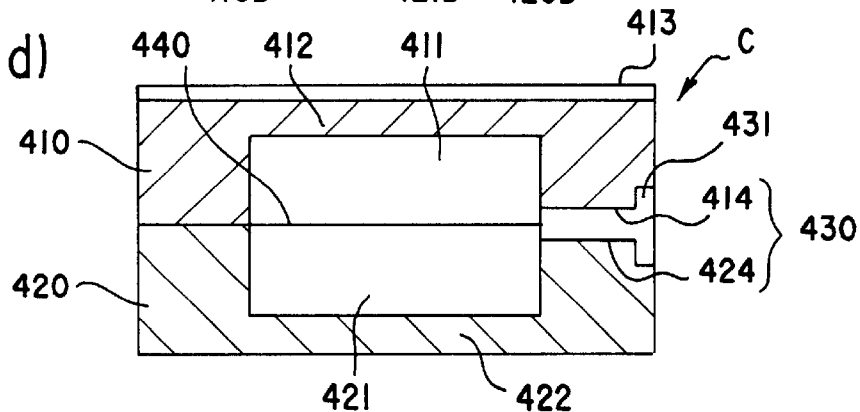

As shown in FIG. 44(D), meanwhile, it may be designed so that a recess 431 may be formed around the communication path 430 formed of the both recesses 411, 421 of the first main body 410 and second main body 420 when the both are combined. Hence, when the recess 431 is filled with adhesive, and the communication path 430 is sealed, the adhesive is not built up, and the pressure-crush type protective device C is mounted flatly, and risk of breakage of adhesive and the first main body 410 and others by external force is lowered. Incidentally, the adhesive for sealing the communication path 430 causes runs when the viscosity is low or is poor in wetting when the viscosity is high, and the control of viscosity is an important point, but by filling the recess 431, it is free from problems of runs and wetting, and the communication path 430 can be sealed securely.

The pressure-crush type protective device C is manufactured in the following manner.

The first main body 410 and second main body 420 are combined with the both recesses 411, 421 face to face, and baked. As a result, a space 440 is formed between the recesses 411, 421. This space 440 communicates with outside through the communication path 430 as mentioned above.

In this state, the communication path 430 is sealed with adhesive, and the space 440 is formed as a space isolated from outside. Thus, the pressure-crush type protective device C is completed.

Further, different from the pressure-crush type protective devices $A_1$ to $A_5$, B and C in structure, pressure-crush type protective devices AA1, AB1, AC1 (hereinafter the pressure-crush type protective device is also called the protective device) used in the rechargeable battery using the pressure-crush type protective device relating to an embodiment of the invention instead of them is described while referring to FIG. 16 to FIG. 24.

Figure 16:
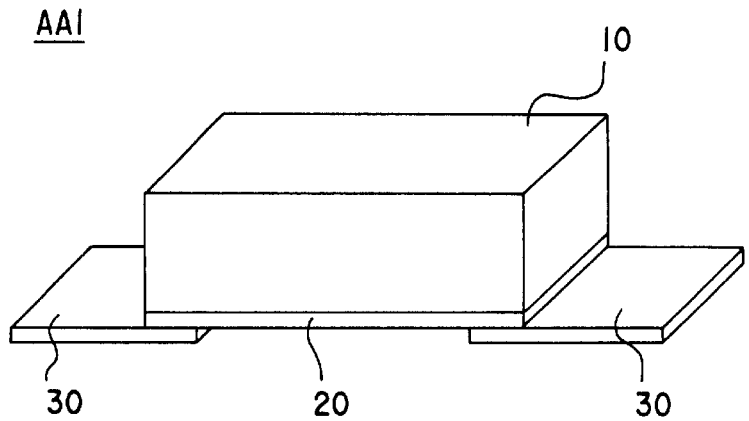
FIG. 16 is a schematic perspective view showing other modified example of the pressure-crush type protective device used in the rechargeable battery using the pressure-crush type protective device according to the embodiment of the invention.
Figure 17:
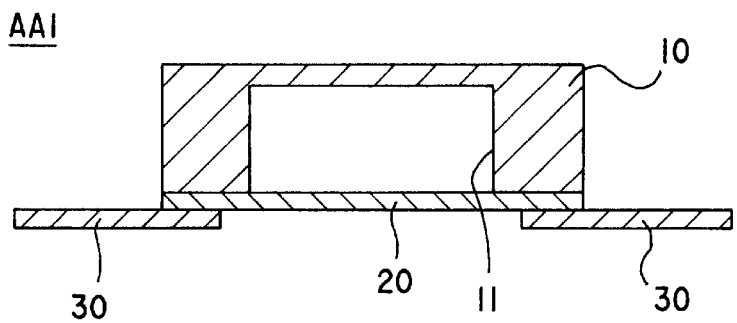
FIG. 17 is a schematic sectional view of the pressure-crush type protective device of FIG. 16.
Figure 18A:
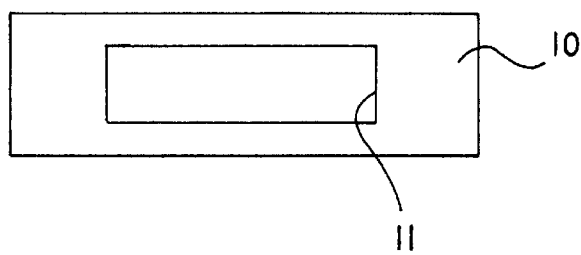
FIG. 18 is a drawing showing a pressure adjusting container of the pressure-crush type protective device of FIG. 16, in which (a) is its schematic bottom view, and (b) is its schematic sectional view.
Figure 18B:
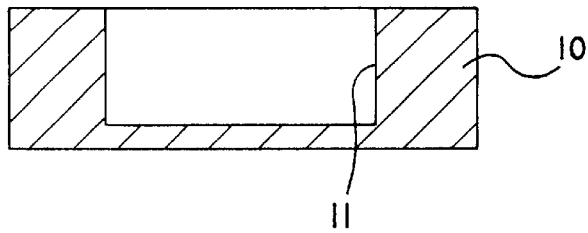
Figure 19A:
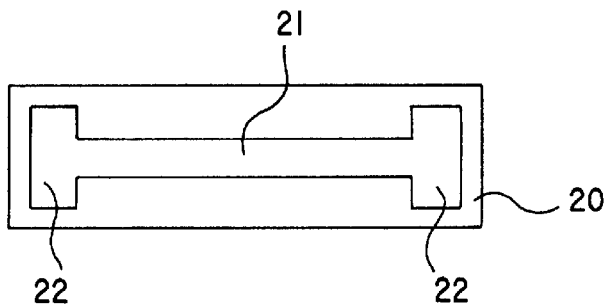
FIG. 19 is a drawing showing a crush plate of the pressure-crush type protective device of FIG. 16, in which (a) is its schematic lower side view, and (b) is its schematic upper side view.
Figure 19B:
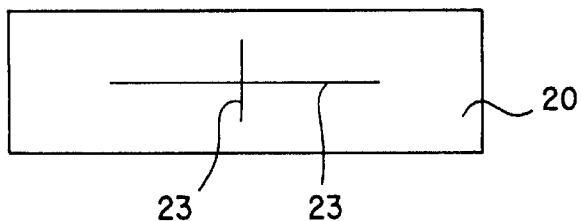
Figure 20:
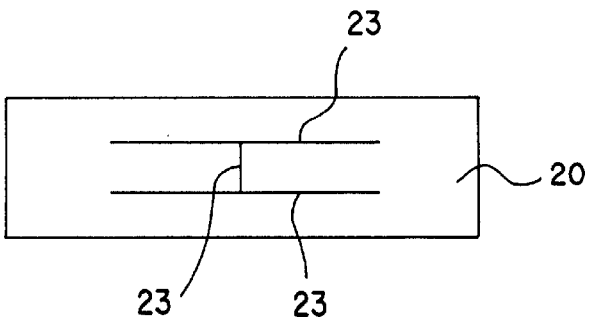
FIG. 20 is a schematic upper side view of the crush plate in other modified example of the pressure-crush type protective device used in the rechargeable battery using the pressure-crush type protective device according to the embodiment of the invention.
Figure 21:
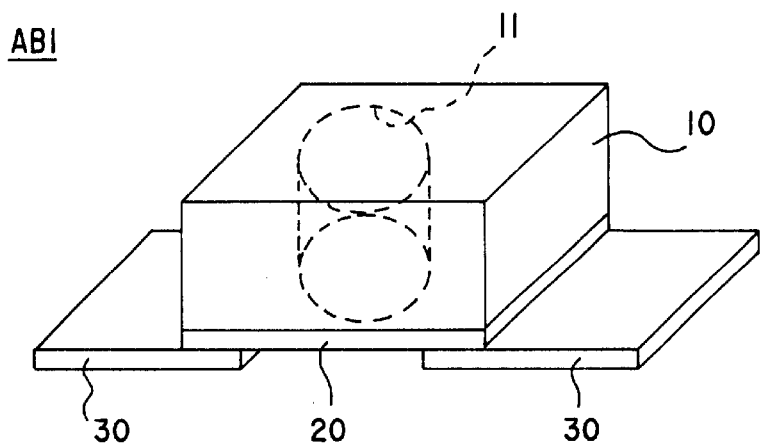
FIG. 21 is a schematic perspective view showing other modified example of the pressure-crush type protective device used in the rechargeable battery using the pressure-crush type protective device according to the embodiment of the invention.
Figure 22:
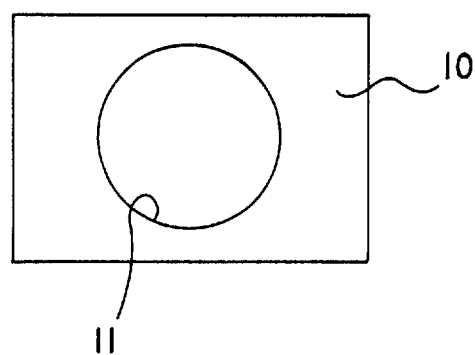
FIG. 22 is a schematic lower side view of the pressure adjusting container of the pressure-crush type protective device of FIG. 21.
Figure 23:
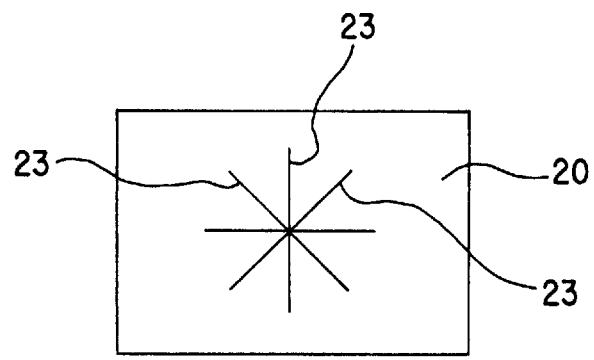
FIG. 23 is a schematic upper side view of the crush plate of the pressure-crush type protective device of FIG. 21.
Figure 24:
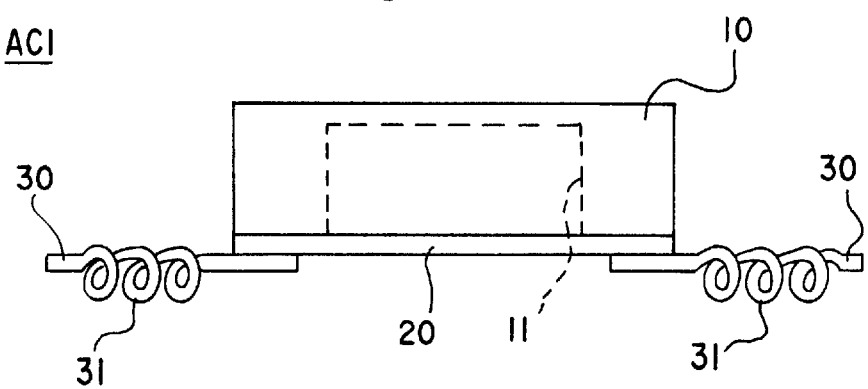
FIG. 24 is a schematic front view showing other modified example of the pressure-crush type protective device used in the rechargeable battery using the pressure-crush type protective device according to the embodiment of the invention.

FIG. 16 is a schematic perspective view showing other modified example of the pressure-crush type protective device used in the rechargeable battery using the pressure-crush type protective device according to the embodiment of the invention, FIG. 17 is a schematic sectional view of the pressure-crush type protective device of FIG. 16, FIG. 18 is a drawing showing a pressure adjusting container of the pressure-crush type protective device of FIG. 16, in which (a) is its schematic bottom view, and (b) is its schematic sectional view, FIG. 19 is a drawing showing a crush plate of the pressure-crush type protective device of FIG. 16, in which (a) is its schematic lower side view, and (b) is its schematic upper side view, FIG. 20 is a schematic upper side view of the crush plate in other modified example of the pressure-crush type protective device used in the rechargeable battery using the pressure-crush type protective device according to the embodiment of the invention, FIG. 21 is a schematic perspective view showing other modified example of the pressure-crush type protective device used in the rechargeable battery using the pressure-crush type protective device according to the embodiment of the invention, FIG. 22 is a schematic lower side view of the pressure adjusting container of the pressure-crush type protective device of FIG. 21, FIG. 23 is a schematic upper side view of the crush plate of the pressure-crush type protective device of FIG. 21, and FIG. 24 is a schematic front view showing other modified example of the pressure-crush type protective device used in the rechargeable battery using the pressure-crush type protective device according to the embodiment of the invention. The embodiments are described below while referring to these drawings.

The protective device AA1 shown in FIG. 16 to FIG. 19 comprises a pressure adjusting container 10, a crush plate 20 having a conductor 21, and a pair of terminals 30 contacting with the conductor 21.

The pressure adjusting container 10 has a nearly rectangular parallelepiped appearance forming a recess 11 in its inside, and the inside of the recess 11 is closed by the crush plate 20. The pressure adjusting container 10 is composed of, for example, ceramic, glass or plastic material. It is fabricated in a size suited to the purpose of use, for example, length of 10 mm, and width and height of several millimeters.

The crushplate 20 has a lid for closing the pressure adjusting container 10, and is formed nearly in the same size as the plane of the pressure adjusting container 10, and contacts tightly with the pressure adjusting container 10. The crush plate 20 is ruptured by the external pressure applied to the protective device AA1. Accordingly, it is made of a relatively weak material, such as ceramic, glass or plastic, and is designed in a plate thickness to be easily broken by a specified operating pressure, for example, about 0.1 to 0.3 mm.

At the lower side of the crush plate 20, as mentioned below, the conductor 21 is formed for connecting the pair of terminals 30 electrically. The conductor 21 is made of a conductive thin metal film such as copper or aluminum, and is formed by adhering the thin metal film to the crush plate 20, or by metal vapor deposition or sputtering. The conductor 21 is formed in a proper film thickness so as to be broken by the rupture of the crush plate 20. At both ends of the conductor 21, a slightly wide junction 22 is formed for connecting with the terminal 30.

At the upper side of the crush plate 20, two orthogonal notch grooves 23 are formed. The shape of the notch grooves 23 is not specified, but, for example, they are formed in a nearly V-section, so that the crush plate 20 may be broken easily by the external force. In particular, the notch grooves 23 are set so as to cross at least the conductor 21. That is, when the crush plate 20 is broken from the notch grooves 23, it is important that the conductor 21 is broken at the same time. When the notch grooves 23 are formed on the upper side of the crush plate 20, moreover, since the lower side of the crush plate 20 is formed flush, so that the conductor 21 may be formed easily.

At the lower side of the crush plate 20, a pair of terminals 30 are provided to connect electrically with the junction 22. The terminals 30 are designed to connect electrically with the terminals 230 of the rechargeable batter 100D1 or the like as shown in FIG. 1, and are formed in plates from conductive metal such as copper or aluminum. At this time, when provided in the rechargeable battery 100D1 or the like, from the view point of absorbing external impact, the thickness of the terminals 30 is preferred to be set at 0.3 mm or less. The protective device AA1 is adhered to the pressure adjusting container 10 with adhesive or the like in a state of tight contact with the crush plate 20. At this time, it is preferred to join them tightly in decompressed state. As a result, the pressure in the pressure adjusting container 10 is reduced, and the crush plate 20 is easily broken by a small external force. Therefore, the operating pressure of the protective device AA1 may be set at a small value, and the sensitivity of the protective device AA1 can be enhanced. This internal pressure should be set according to the desired operating pressure, and differs depending on the structure of the crush plate 20, but from the viewpoint of obtaining a stable operating pressure, it is particularly preferred to set at 0.5 atmospheric pressure or less. The pair of terminals 30 are then adhered to the crush plate 20 so as to contact with the junction 22, and the protective device AA1 is fabricated.

In the crush plate 20, like the crush plate 20 in FIG. 20, for example, the notch grooves 23 may be formed in an H-shape, and the layout of the notch grooves 23 is not particularly specified. However, they are disposed so as to be broken easily. In particular, it is important that the notch grooves 23 should cross at least the conductor 21. It is also considered to form the notch grooves 23 at the lower side of the crush plate 20 so as not to cut off the electric connection of the conductor 21.

In the protective device AB1 shown in FIG. 21, the recess 11 of the pressure adjusting container 10 is formed in a nearly cylindrical shape as shown in FIG. 22. Thus, by forming the recess 11 in a nearly cylindrical shape, a uniform stress is created in the crush plate 20, and a stable operating pressure may be obtained. At this time, as shown in FIG. 23, by forming radial notch grooves 23 in the crush plate 20, a more stable operating pressure may be obtained. The appearance or shape of the pressure adjusting container 10 is not particularly specified, and it may formed, for example, in a cubic shape.

Further, in the protective device AC1 shown in FIG. 24, a part of the terminal 30 is formed in a coil, and it serves also as a shock absorber 31. As the terminal 30 also serves as the shock absorber 31, for example, when the rechargeable battery 100D1 is dropped, and an external impact is applied to the protective device AC1, the impact is damped by the shock absorber 31. As a result, the protective device AC1 is protected from breakage due to external impact, and the protective device of high reliability is presented.

Thus, in the protective devices AA1, AB1, AC1, the protective devices are manufactured in a simple structure. In particular, it is preferred to manufacture the pressure adjusting container 10 and crush plate 20 from ceramics, and it is possible to reduce the size precisely.

Further, different from the foregoing pressure-crush type protective devices in structure, pressure-crush type protective devices AA2, AB2, AC2 used in the rechargeable battery using the pressure-crush type protective device relating to an embodiment of the invention instead of them is described while referring to FIG. 25 to FIG. 33.

Figure 25:
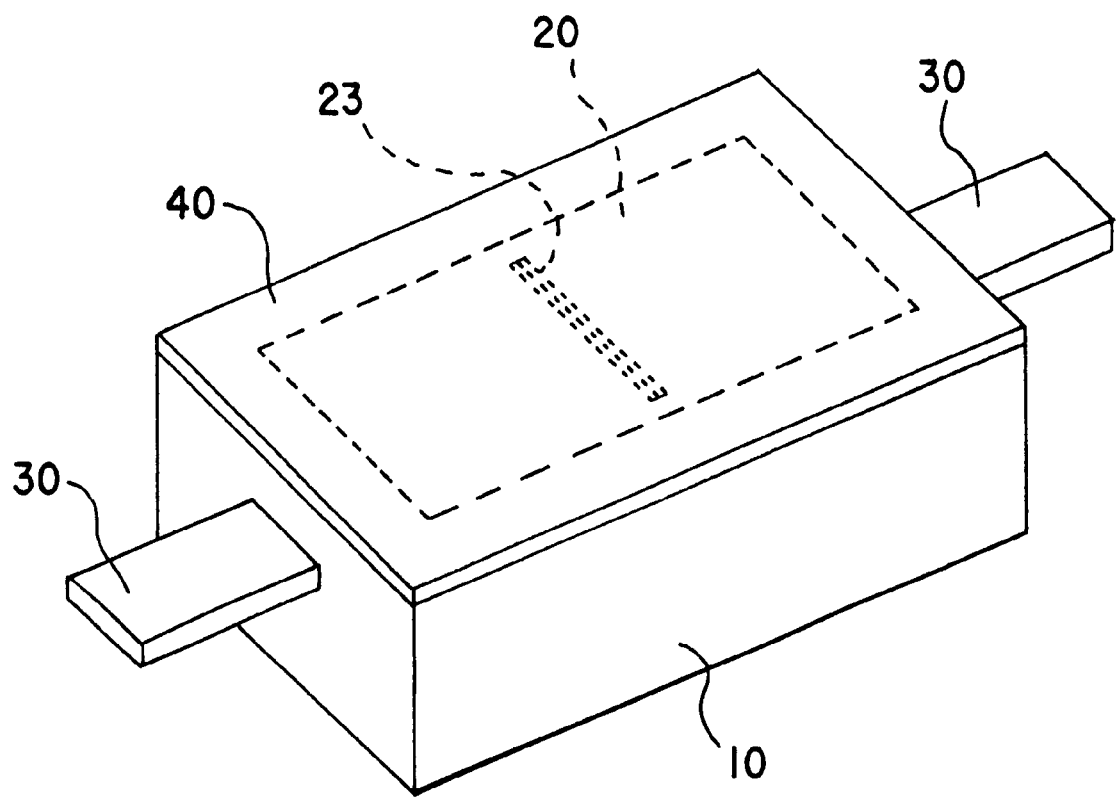
FIG. 25 is a schematic perspective view showing other modified example of the pressure-crush type protective device used in the rechargeable battery using the pressure-crush type protective device according to the embodiment of the invention.
Figure 26:
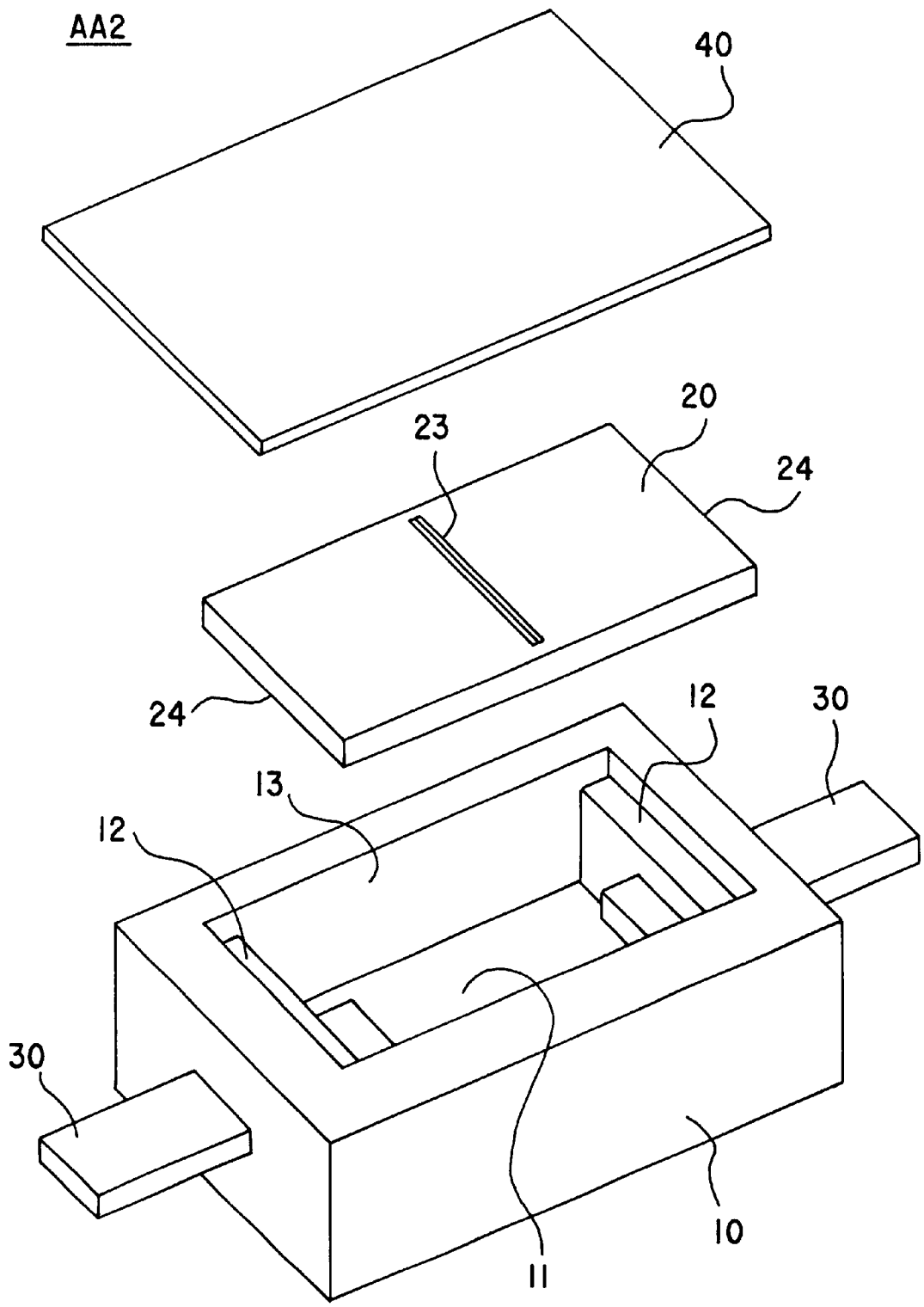
FIG. 26 is a schematic exploded perspective view of the pressure-crush type protective device of FIG. 25.
Figure 27:
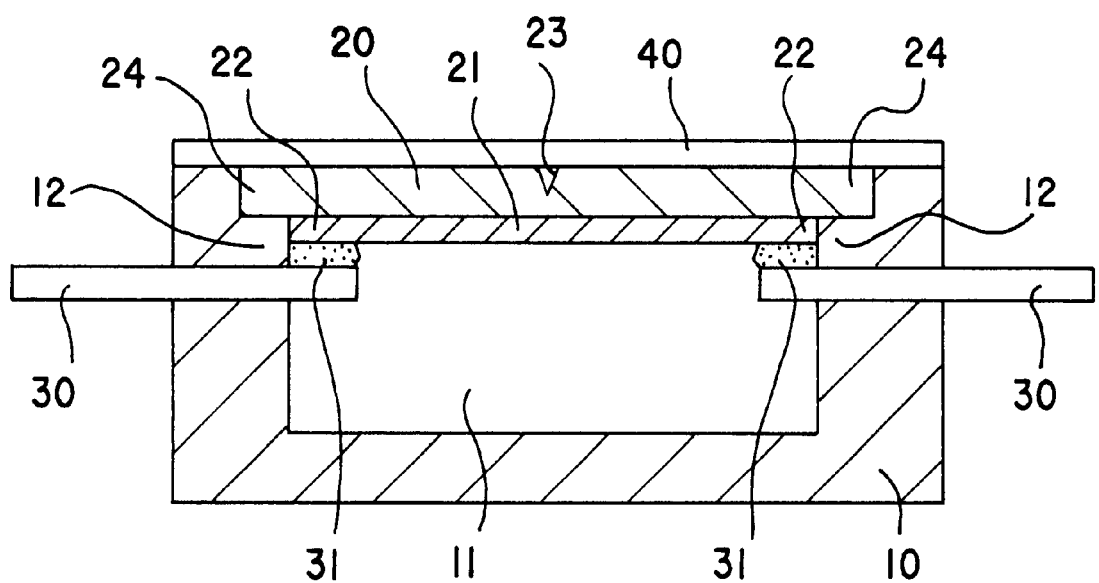
FIG. 27 is a schematic sectional structural view of the pressure-crush type protective device of FIG. 25.
Figure 28A:
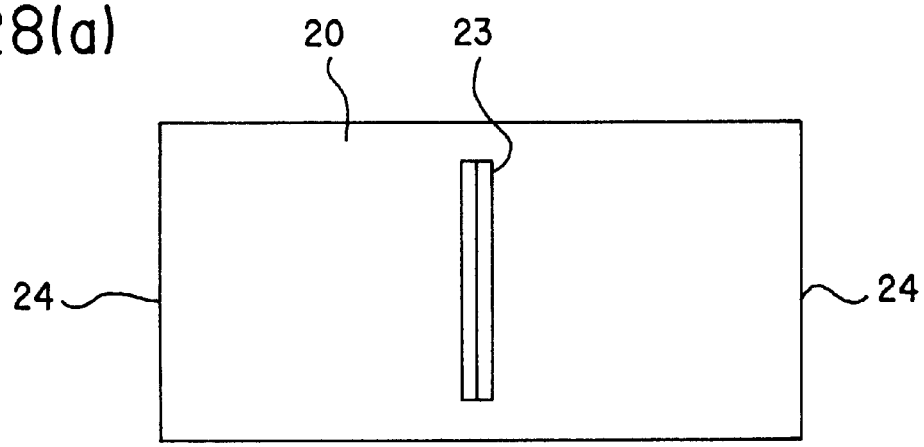
FIG. 28 is a drawing showing the crush plate of the pressure-crush type protective device of FIG. 25, in which (a) is its schematic plan view, (b) is its schematic sectional view, and (c) is its schematic back side view.
Figure 28B:
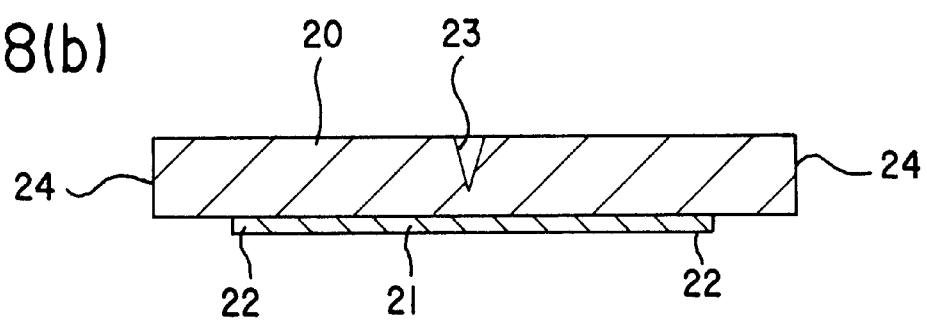
Figure 28C:
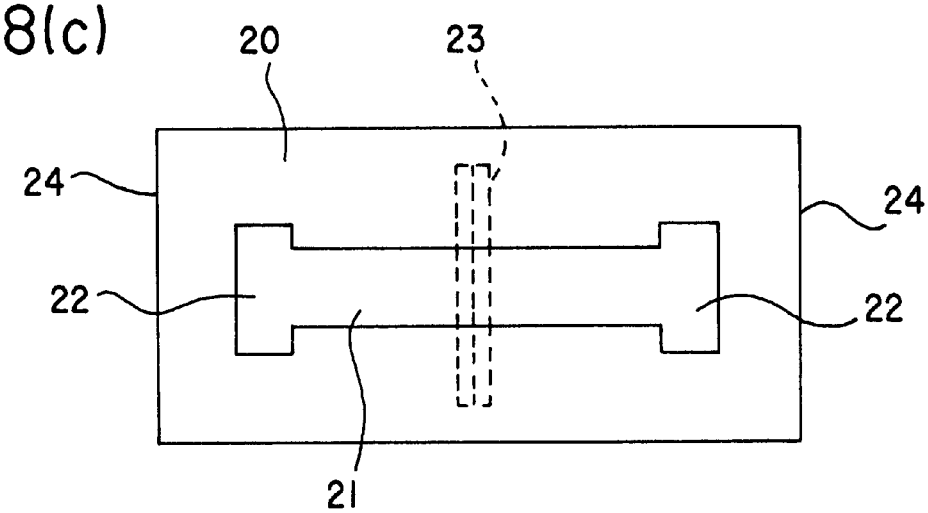
Figure 29:
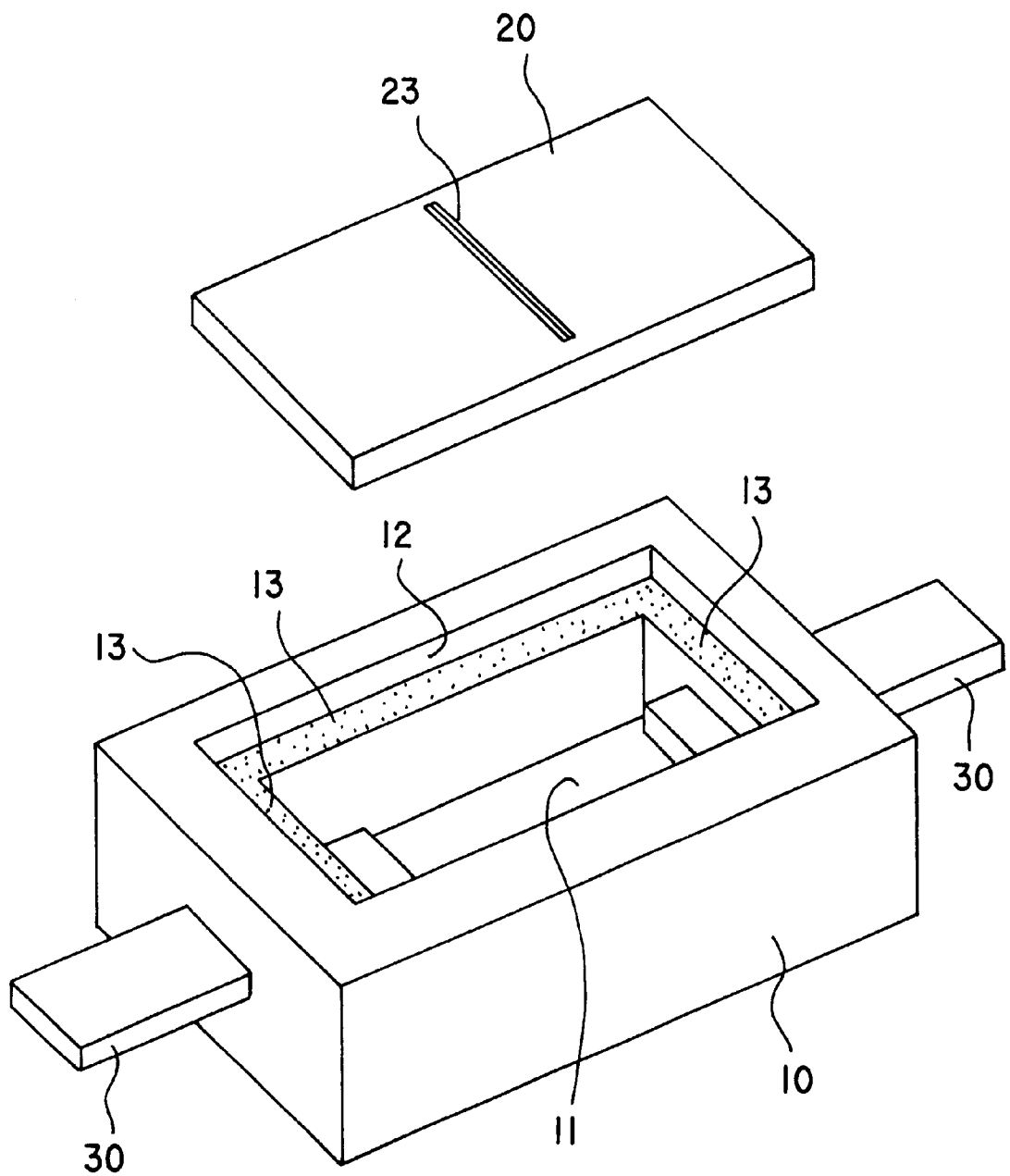
FIG. 29 is a schematic explanatory diagram showing the advantage of the pressure-crush type protective device of FIG. 25.
Figure 30:
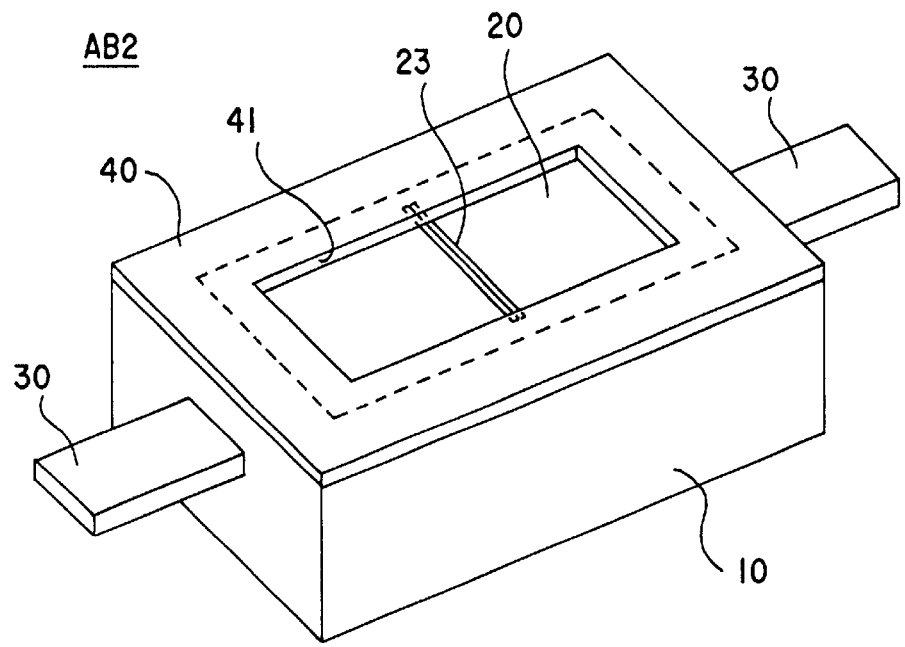
FIG. 30 is a schematic perspective view showing other modified example of the pressure-crush type protective device used in the rechargeable battery using the pressure-crush type protective device according to the embodiment of the invention.
Figure 31:
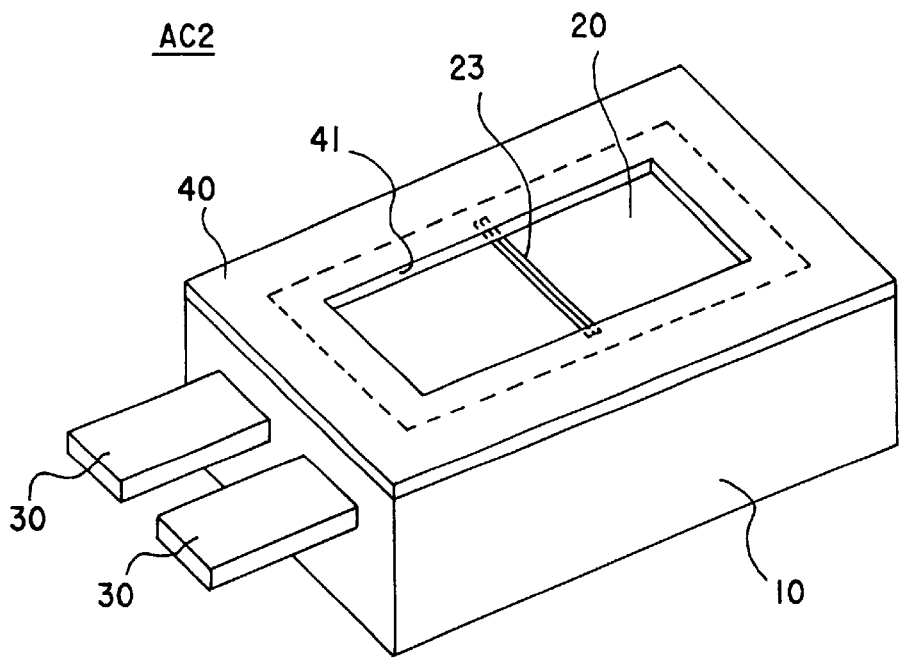
FIG. 31 is a schematic perspective view showing other modified example of the pressure-crush type protective device used in the rechargeable battery using the pressure-crush type protective device according to the embodiment of the invention.
Figure 32:
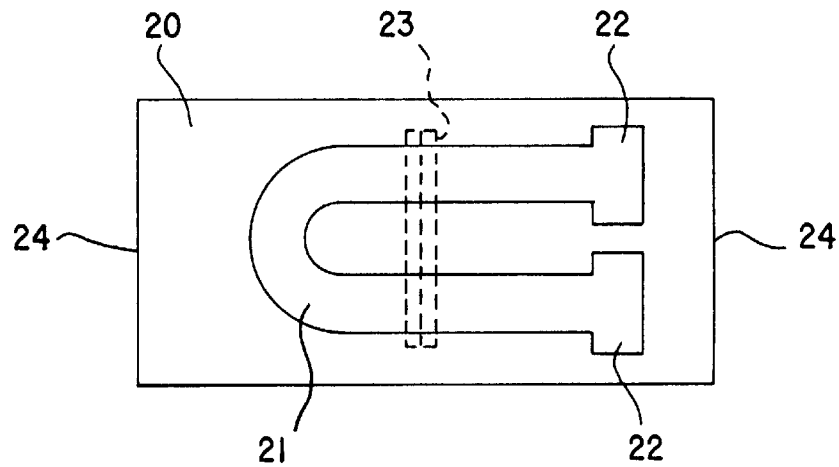
FIG. 32 is a schematic back side view of the crush plate of the pressure-crush type protective device of FIG. 31.
Figure 33A:
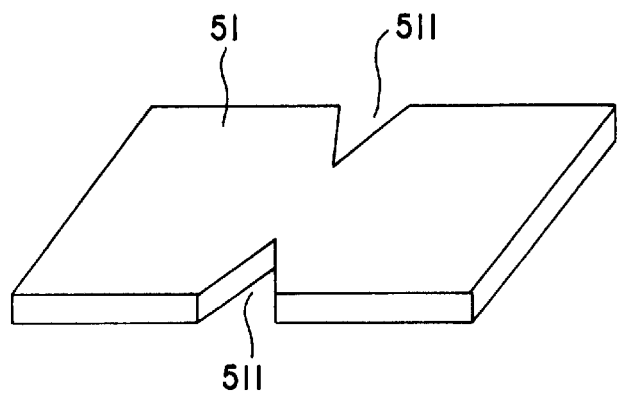
FIG. 33 is a schematic perspective view of a modified example of the crush plate of the pressure-crush type protective device of FIGS. 25, 30 or 31.
Figure 33B:
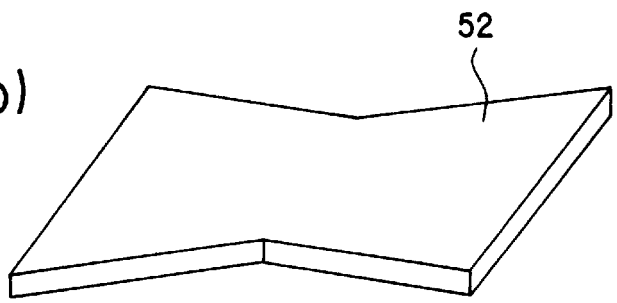
Figure 33C:
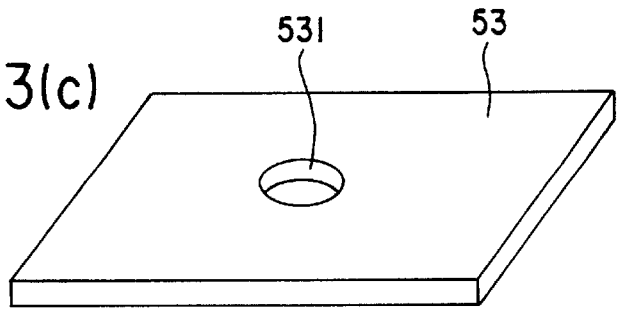

FIG. 25 is a schematic perspective view showing other modified example of the pressure-crush type protective device used in the rechargeable battery using the pressure-crush type protective device according to the embodiment of the invention, FIG. 26 is a schematic exploded perspective view of the pressure-crush type protective device of FIG. 25, FIG. 27 is a schematic sectional structural view of the pressure-crush type protective device of FIG. 25, FIG. 28 is a drawing showing the crush plate of the pressure-crush type protective device of FIG. 25, in which (a) is its schematic plan view, (b) is its schematic sectional view, and (c) is its schematic back side view, FIG. 29 is a schematic explanatory diagram showing the advantage of the pressure-crush type protective device of FIG. 25, FIG. 30 is a schematic perspective view showing other modified example of the pressure-crush type protective device used in the rechargeable battery using the pressure-crush type protective device according to the embodiment of the invention, FIG. 31 is a schematic perspective view showing other modified example of the pressure-crush type protective device used in the rechargeable battery using the pressure-crush type protective device according to the embodiment of the invention, FIG. 32 is a schematic back side view of the crush plate of the pressure-crush type protective device of FIG. 31, and FIG. 33 is a schematic perspective view of a modified example of the crush plate of the pressure-crush type protective device of FIGS. 25, 30 or 31.

The protective device AA2 shown in FIG. 25 and FIG. 26 comprises a pressure adjusting container 10, a crush plate 20 having a conductor 21, a pair of terminals 30 contacting with the conductor 21, and a film sheet 40 for sealing the pressure adjusting container 10.

The pressure adjusting container 10 has a nearly funnel shape forming a recess 11 in its inside. At both ends in the recess 11, supporters 12 for supporting the crush plate 20 at both sides are formed. In the pressure adjusting container 10, therefore, the recess 11 is covered with the crush plate 20 supported by the supporters 12. The pressure adjusting container 10 is composed of, for example, ceramic, glass or plastic material, and is fabricated in a size suited to the purpose of use, for example, length of 10 mm, and width and height of several millimeters. In particular, when the both pressure adjusting container 10 and crushplate 20 are made of ceramics, the pressure adjusting container 10 and crush plate 20 of high precision are obtained, so that the protective device AA2 of small size and high reliability is realized.

The pressure adjusting container 10 has a pair of terminals 30 connecting electrically to the junction 22 provided in the crush plate 20. The terminals 30 are for connecting electrically with terminals 230 of the rechargeable battery 100D1 or the like shown in FIG. 1, and are formed in plates from conductive metal such as copper or aluminum.

The thickness of the terminals 30 is preferred to be set at 0.3 mm or less from the viewpoint of absorbing the external impact when provided in the rechargeable battery 100D1 or the like. The terminals 30 are provided in the pressure adjusting container 10 by insert forming. By insert forming of the terminals 30, the number of components is decreased, and it is easier to assemble the protective device A.

The crush plate 20 is a portion for forming the lid of the pressure adjusting container 10, and is formed nearly in the same size as the opening 13 of the pressure adjusting container 10, and is fabricated to be fitted into the recess 11. The crush plate 20 is ruptured by the external pressure applied to the protective device AA2. Accordingly, it is made of a relatively weak material, such as ceramic, glass or plastic, and is designed in a plate thickness to be easily broken by a specified operating pressure, for example, about 0.1 to 0.3 mm.

It is ideal to fabricate this crush plate 20 in a size for filling the opening 13 with the crush plate 20 without allowing gap and sealing, but in this invention it is enough when the crush plate 20 is easily fitted into the opening 13, and there is no problem if a slight gap is formed between the pressure adjusting container and the crush plate 20. That is, in the invention, it is enough when the pressure adjusting container 10 is closed by the film sheet 40 adhered to the pressure adjusting container 10, and the crush plate 20 is broken by the external force applied to the protective device AA2.

On the other hand, if the crush plate 20 is fabricated in a small size and a large gap is left at both sides of the crush plate 20, strength setting of the film sheet 40 is difficult. Hence, it is preferred to fabricate so that the crush plate 20 may be properly fitted into the recess 11.

A notch groove 23 is formed on the upper side of the crush plate 20. The shape of the notch groove 23 is not particularly specified, and is formed in a nearly V-section, for example, so that the crushplate 20 maybe easily broken by external force. The notch groove 23 is disposed nearly parallel to both supported sides 24 of the crush plate 20.

That is, since the crush plate 20 is broken by external force, by disposing parallel to both supported sides 24, the crushing direction of the crush plate 20 is specific as described below, so that a stable operating pressure is obtained. The notch groove 23 may be also disposed at the lower side of the crush plate 20, but when formed on the upper side of the crush plate 20, the lower side of the crush plate 20 is formed flush, and it is easier to form the conductor 21. It is also preferred to form the notch groove 23 so as to be supported symmetrically about the center of the notch groove 23. As a result, the stress formed on the crush plate 20 is concentrated on the notch groove 23, and the crush plate 20 is easily broken, so that the sensitivity is enhanced, while sensitivity fluctuations are smaller.

At the lower side of the crush plate 20, as mentioned below, the conductor 21 is formed for connecting the pair of terminals 30 electrically. The conductor 21 is made of a conductive thin metal film such as copper or aluminum, and is formed by adhering the thin metal film to the crush plate 20, or by metal vapor deposition or sputtering. The conductor 21 is formed in a proper film thickness so as to be broken by the rupture of the crush plate 20.

At both ends of the conductor 21, a slightly wide junction 22 is for men for connecting with the terminals 30. In particular, the conductor 21 is set so as to cross at least the notch groove 23. That is, when the crush plate 20 is broken from this notch groove 23, it is important that the conductor 21 is broken at the same time so as to cut off conduction between electrodes.

The protective device AA2 is fitted into the recess 11 so as to cover the recess 11, with both sides 24 of the crush plate 20 supported at both sides by the supporters 12. At this time, from the viewpoint of ease of breakage of the crush plate 20, it is preferred to support the side 24 parallel to the direction of minor ax is of the crush plate 20. The conductor 21 and terminals 30 are connected electrically by using conductive adhesive 31 as shown in FIG. 27, or reflow heat by using cream solder. Since the conductor 21 and terminals 30 are fixed by conductive adhesive 31 or solder, it is not required to fix the crush plate 20 to the supporters 12, but they maybe also fixed.

The upper side of the pressure adjusting container 10 is covered with the film sheet 40, and the peripheral edge of the film sheet 40 is adhered to the upper end around the opening 13 of the pressure adjusting container 10 with adhesive or heat bonding so as to close the pressure adjusting container 10. At this time, it is preferred to adhere the film sheet 40 at reduced pressure. As a result, the pressure adjusting container 10 is in decompressed state, and the crush plate 20 is broken easily by a small external force. The operating pressure of the protective device A can be therefore set at a small value, and the sensitivity of the protective device AA2 can be enhanced. This pressure is preferably set according to the desired operating force, and differs with the structure of the crush plate 20, but from the viewpoint of obtaining a stable operating pressure, it is particularly preferred to set at 0.5 atmospheric pressure or less.

The material of the film sheet 40 is not particularly defined as far as the pressure adjusting container 10 can be closed, and, for example, it is made of various plastic materials such as polyethylene, polypropylene, and polyvinyl chloride. The film sheet 40 is preferred to have a certain flexibility because an external pressure must be applied to the crush plate 20 through the film sheet 40.

As shown in FIG. 29, it may be also considered to fit the crush plate 20 into the recess 11, and close its surrounding by supporting by the supporters 12 formed on the pressure adjusting container 10. In such structure, however, since the entire periphery of the crush plate 20 is fixed by the pressure adjusting container 10 in the shaded area in FIG. 29, and the crush plate 20 is not broken easily, and a specific crushing pressure is not obtained. In this respect, by supporting the crush plate 20 at both sides, the portion fixed to the pressure adjusting container 10 is smaller, and it is broken by a smaller crushing pressure, and a specific operating force can be set.

In the protective device AB2 shown in FIG. 30, an opening 41 is provided in the region corresponding to the central part of the crush plate 20 of the film sheet 40. In this protective device AB2, therefore, the film sheet 40 is adhered to the upper end in the periphery of the opening 13 of the pressure adjusting container 10 and the upper peripheral edge of the crush plate 20, and the pressure adjusting container 10 is closed. Thus, by forming the opening 41 in the film sheet 40 to expose the crush plate 20, the external pressure of the protective device AB2 is directly applied to the crush plate 20, and the sensitivity is enhanced. It is also beneficial to suppress fluctuations of sensitivity due to variation of adhesion of the film sheet 40.

In the protective device AC2 shown in FIG. 31, a pair of terminals 30 are formed at the same side of the pressure adjusting container 10 by insert forming. The crush plate 20 of the protective device AC2 has a conductor 21 formed in a nearly U-shape so as to connect with the terminals 30 as shown in FIG. 32, and at one side of the crush plate 20, the conductor 21 and terminals 30 are connected electrically with each other. The conductor 21 is disposed crossing the notch groove 23 provided in the crush plate 20 same as in the protective device AA2.

Thus, in the protective device AC2, the terminals 30 are formed on the same side of the pressure adjusting container 10. Accordingly, unlike the mutually opposite terminals 230 of the rechargeable battery 100D1 or the like, when the structure is changed to form the terminals of the rechargeable battery 100D1 or the like at the same side, this protective device AC2 is suited.

In the embodiment, the notch groove 23 is formed in the crush plate 20, the crush plate without notch groove may be also used. Further, same effects are obtained in a crush plate 51 having a notch 511 only in the edge as shown in FIG. 33(*a*), a crush plate 52 formed like a drum in a plan view as shown in FIG. 33 (*b*), or a crush plate 53 forming an opening 531 as shown in FIG. 33(*c*).

Further, different from the foregoing pressure-crush type protective devices in structure, pressure-crush type protective devices AA3, AB3, AC3 used in the rechargeable battery using the pressure-crush type protective device relating to an embodiment of the invention instead of them is described while referring to FIG. 34 to FIG. 40.

Figure 34:
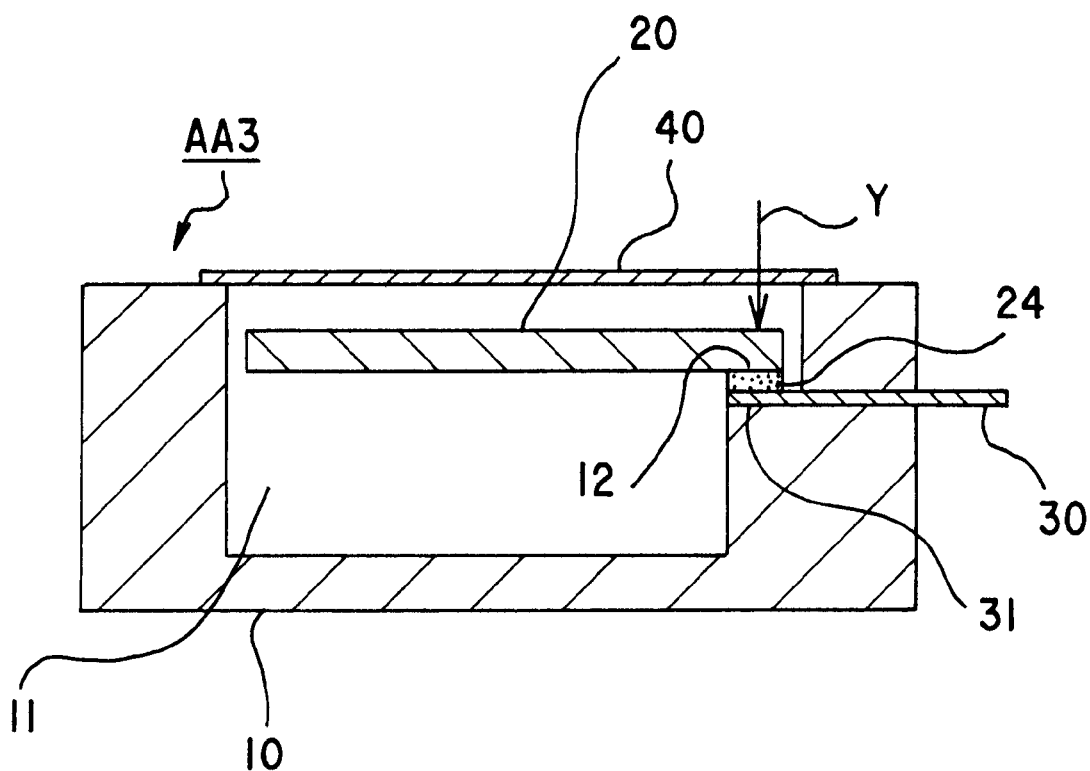
FIG. 34 is a schematic sectional view showing other modified example of the pressure-crush type protective device used in the rechargeable battery using the pressure-crush type protective device according to the embodiment of the invention.
Figure 35:
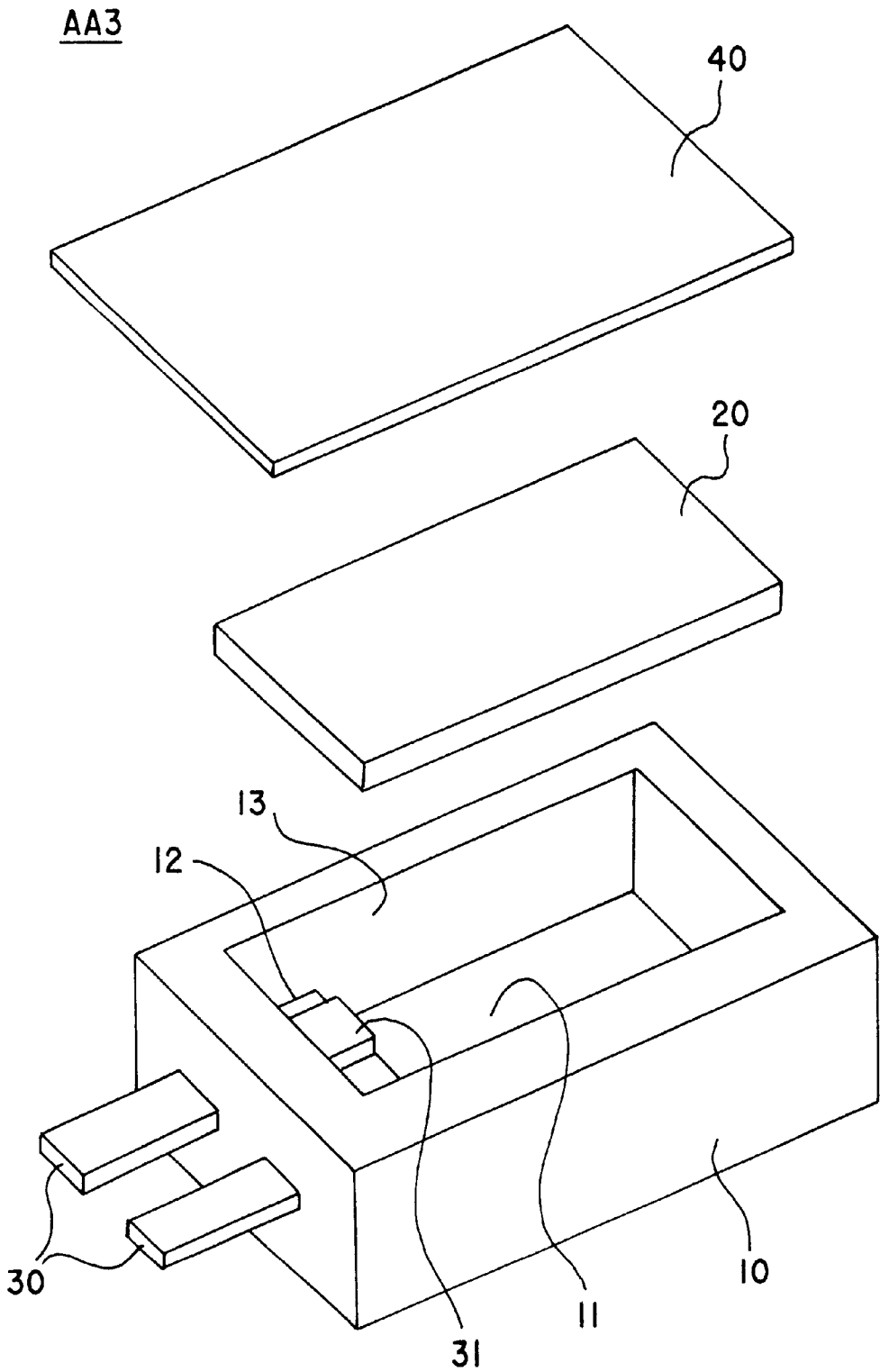
FIG. 35 is a schematic exploded perspective view of the pressure-crush type protective device of FIG. 34.
Figure 36:
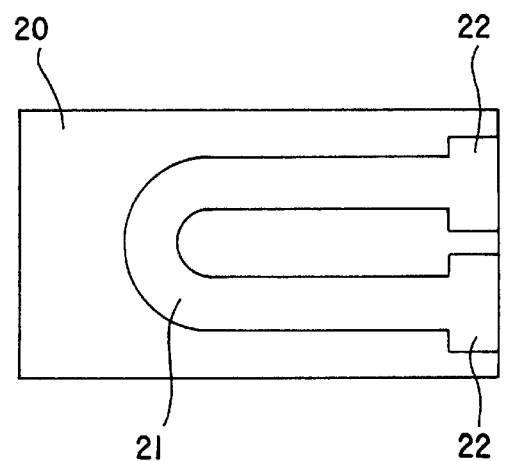
FIG. 36 is a schematic bottom view of the crush plate used in the pressure-crush type protective device of FIG. 34.
Figure 37:
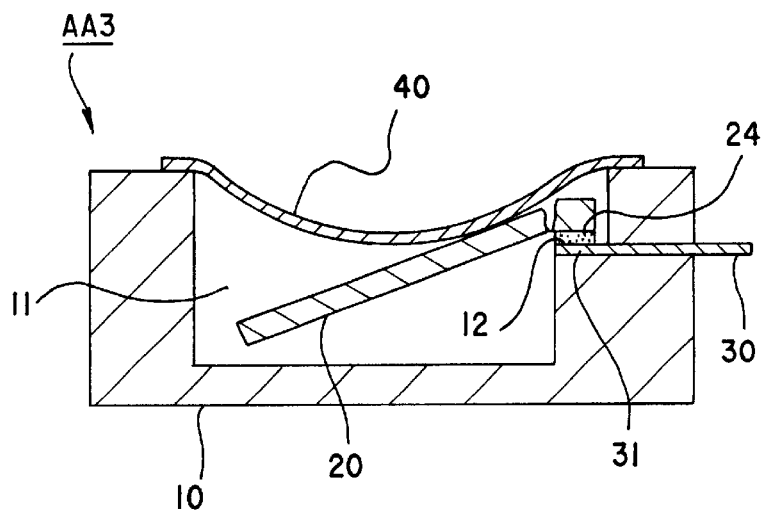
FIG. 37 is a schematic sectional view showing the operation of the pressure-crush type protective device of FIG. 34.
Figure 38:
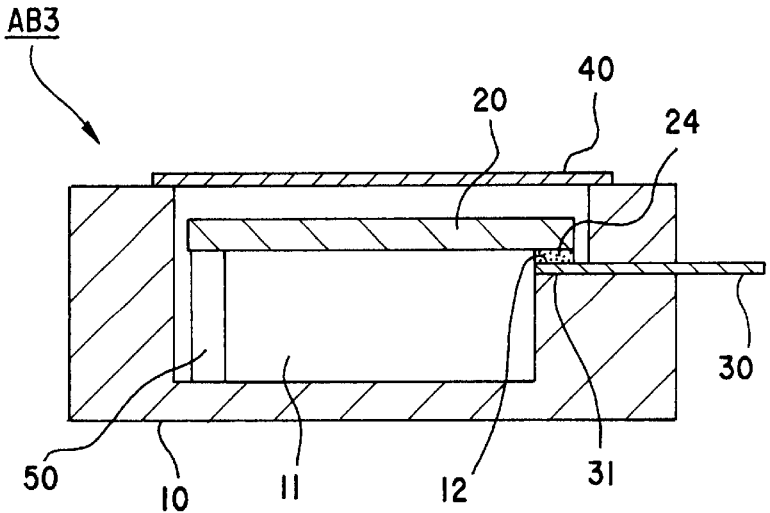
FIG. 38 is a schematic sectional view showing other modified example of the pressure-crush type protective device used in the rechargeable battery using the pressure-crush type protective device according to the embodiment of the invention.
Figure 39:
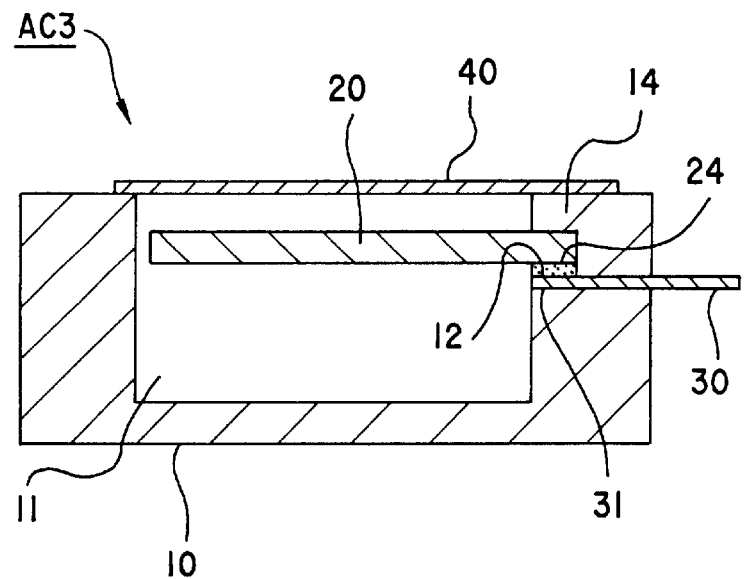
FIG. 39 is a schematic sectional view showing other modified example of the pressure-crush type protective device used in the rechargeable battery using the pressure-crush type protective device according to the embodiment of the invention.
Figure 40:
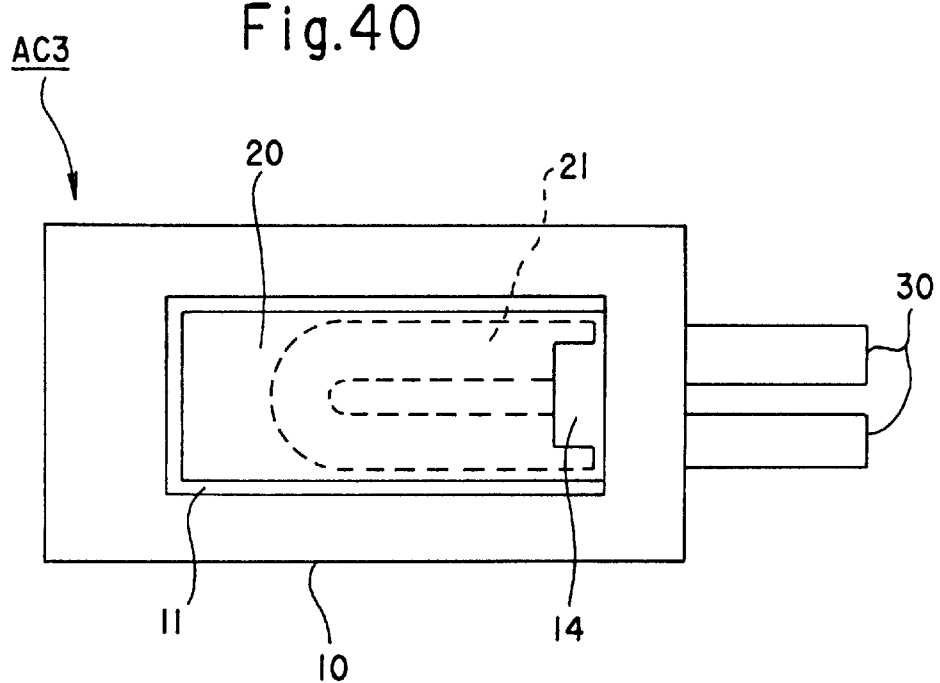
FIG. 40 is a schematic plan view in a state of removing the film sheet from the pressure-crush type protective device of FIG. 39.

FIG. 34 is a schematic sectional view showing other modified example of the pressure-crush type protective device used in the rechargeable battery using the pressure-crush type protective device according to the embodiment of the invention, FIG. 35 is a schematic exploded perspective view of the pressure-crush type protective device of FIG. 34, FIG. 36 is a schematic bottom view of the crush plate used in the pressure-crush type protective device of FIG. 34, FIG. 37 is a schematic sectional view showing the operation of the pressure-crush type protective device of FIG. 34, FIG. 38 is a schematic sectional view showing other modified example of the pressure-crush type protective device used in the rechargeable battery using the pressure-crush type protective device according to the embodiment of the invention, FIG. 39 is a schematic sectional view showing other modified example of the pressure-crush type protective device used in the rechargeable battery using the pressure-crush type protective device according to the embodiment of the invention, and FIG. 40 is a schematic plan view in a state of removing the film sheet from the pressure-crush type protective device of FIG. 39.

The pressure-crush type protective device AA3 shown in FIG. 34 comprises a pressure adjusting container 10, a crush plate 20 having a conductor 21, a pair of terminals 30 contacting with the conductor 21, and a film sheet 40 for sealing the pressure adjusting container 10.

The pressure adjusting container 10 has a nearly funnel shape forming a recess 11 in its inside. At one end in the recess 11, a supporter 12 for supporting the crush plate 20 at one side is formed. In the pressure adjusting container 10, therefore, the recess 11 is covered almost with the crush plate 20 supported by the supporter 12. The supporter 12 is set so that the upper side of the crush plate 20 supported by the supporter 12 may be positioned lower than the upper side of the pressure adjusting container 10.

The pressure adjusting container 10 is composed of, for example, ceramic, glass or plastic material, and is fabricated in a size suited to the purpose of use, for example, length of 10 mm, and width and height of several millimeters. In particular, when the both pressure adjusting container 10 and crush plate 20 are made of ceramics, the pressure adjusting container 10 and crush plate 20 of high precision are obtained, so that the protective device AA3 of small size and high reliability is realized.

The pressure adjusting container 10 has a pair of terminals 30 connecting electrically to the junction 22 provided in the crush plate 20. The terminals 30 have the end 31 exposed on the upper side of the supporter 12 as shown in FIG. 35. In FIG. 35, for the convenience of drawing, only the end 31 of one terminal 30 out of the pair of terminals 30 exposed on the supporter 12 is shown.

The crush plate 20 is a portion for forming the lid of the pressure adjusting container 10, and is formed nearly in the same size as or slightly smaller than the opening 13 of the pressure adjusting container 10, and is fabricated to be fitted into the recess 11. The crush plate 20 is ruptured by the external pressure applied to the protective device AA3. Accordingly, it is made of a relatively weak material, such as ceramic, glass or plastic, and is designed in a plate thickness to be easily broken by a specified operating pressure, for example, about 0.1 to 0.3 mm.

Instead of filling the opening 13 with the crush plate 20 without allowing gap, it is preferred to have a certain gap between the crush plate 20 and the opening 13. This is because the crush plate 20 is supported at one side by the pressure adjusting container 10, and, unless the gap is provided, the broken crush plate 20 may not drop into the recess 11 and electric connection cannot be cut off.

On the other hand, if the crush plate 20 is too small, it is hard to set the strength of the film sheet 40. Accordingly, the crush plate 20 is preferably fabricated so as to be fitted easily into the recess 11.

At the lower side of the crush plate 20, the conductor 21 is formed for connecting with the pair of terminals 30 electrically. The conductor 21 is made of a conductive thin metal film such as copper or aluminum, and is formed by adhering the thin metal film to the crush plate 20, or by metal vapor deposition, sputtering or printing. The conductor 21 is formed in a proper film thickness so as to be broken by the rupture of the crush plate 20. The conductor 21 is formed in a nearly U-shape as shown in FIG. 3, and its end 22 is slightly wider for connecting with the terminals 30.

The pressure-crush type protective device AA3 is supported at one side, having the one side of the crush plate 20, that is, the wider end 22 of the conductor 21 placed on the supporter 12, and is fitted into the recess 11 so as to nearly cover the recess 11. The conductor 21 and terminals 30 are connected electrically by using conductive adhesive 24 or cream solder. Thus, the crush plate 20 is supported at one side by the supporter 12.

When connecting the conductor 21 of the crush plate 20 and the terminals 30, in order that the crush plate 20 may be supported at one side by the supporter 12, a force is applied in the direction of arrow Y as shown in FIG. 34 by the tool not shown.

The upper side of the pressure adjusting container 10 is covered with the film sheet 40, and the peripheral edge of the film sheet 40 is adhered to the upper end around the opening 13 of the pressure adjusting container 10 with adhesive or heat bonding so as to close the pressure adjusting container 10. At this time, since the supporter 12 is set so that the upper side of the crush plate 20 supported by the supporter 12 may be positioned lower than the upper side of the pressure adjusting container 10, the film sheet 40 does not contact with the crush plate 20.

Also at this time, it is preferred to adhere the film sheet 40 at reduced pressure. As a result, the pressure adjusting container 10 is in decompressed state, and the crush plate 20 is broken easily by a small external force. The operating pressure of the protective device AA3 can be therefore set at a small value, and the sensitivity of the protective device AA3 can be enhanced. This pressure is preferably set according to the desired operating pressure, and differs with the structure of the crush plate 20, but from the viewpoint of obtaining a stable operating pressure, it is particularly preferred to set at 0.5 atmospheric pressure or less.

The material of the film sheet 40 is not particularly defined as far as the pressure adjusting container 10 can be closed, and, for example, it is made of various plastic materials such as polyethylene, polypropylene, and polyvinyl chloride. The film sheet 40 is preferred to have a certain flexibility because an external pressure must be applied to the crush plate 20 through the film sheet 40.

In the pressure-crush type protective device AA3, when supporting the crush plate 20 by the supporter 12, a force is applied in the direction of arrow Y as shown in FIG. 34, but the pressure-crush type protective device AB3 as shown in FIG. 38 may be also considered. In this pressure-crush type protective device AB3, at the side not supporting the crush plate 20, a provisional holding member 50 having flexibility for supporting the crush plate 20 is disposed in the recess 11. Thus, by holding the crush plate 20 provisionally by the provisional holding member 50, it is possible to assemble without applying force. The provisional holding member 50 must be made of a material having a certain flexibility such as sponge and felt. That is, it requires such flexibility as to support the crush plate 20 when mounting the crush plate 20, and allow to break, without supporting, the crush plate 20 when a pressure larger than specified is applied.

When supporting the crush plate 20, without resort to the force in the direction of arrow Y in FIG. 34 or use of the provisional holding member 50, it is also possible to hold the crush plate 20 by a holder 14 formed in the pressure adjusting container 10 as in the pressure-crush type protective device AC3 shown in FIG. 39 and FIG. 40.

This holder 14 is part of the pressure adjusting container 10, and by using a slide core in the die when forming the pressure adjusting container 10, it is possible to form with a gap for allowing to fit the crush plate 20 above the supporter 12 by this slide core. Therefore, by fitting the crush plate 20 into the holder 14, the conductor 21 and the terminals 30 are electrically connected by conductive adhesive 24 or cream solder.

In the rechargeable battery 100D1 or the like, meanwhile, a separate pressure-crush type protective device $A_1$ is fitted to the spacer 20, but the pressure-crush type protective device may be composed on the spacer 20 itself. Such rechargeable battery is explained below as the rechargeable battery 100DA1 using the pressure-crush type protective device relating to a further different embodiment of the invention while referring to FIG. 41 to FIG. 43.

Figure 41:
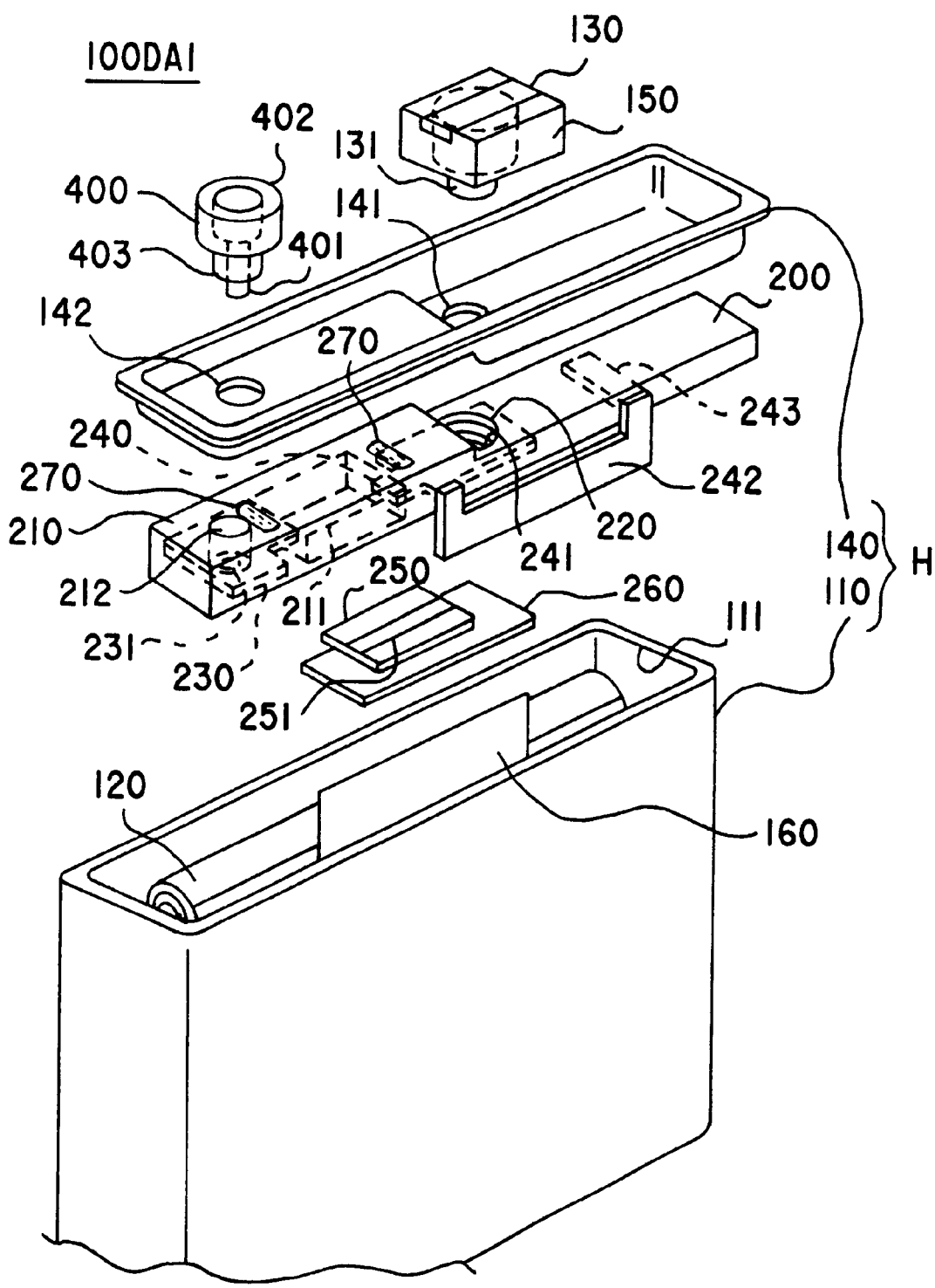
FIG. 41 is a schematic exploded perspective view showing the rechargeable battery using the pressure-crush type protective device according to a different embodiment of the invention.
Figure 42:
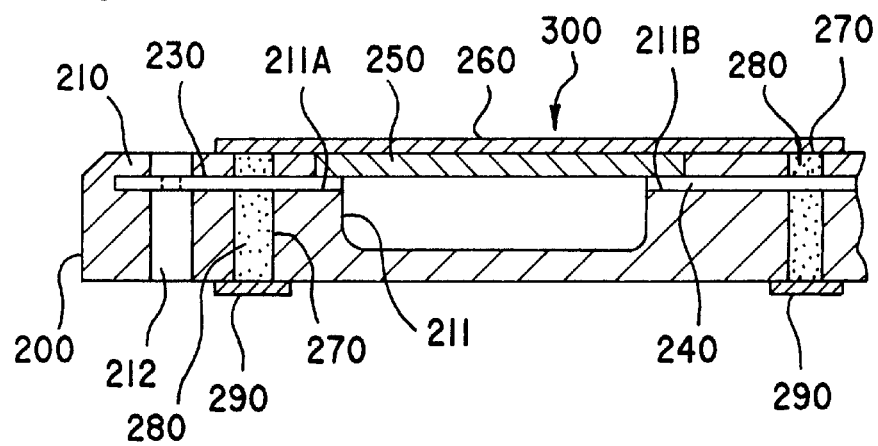
FIG. 42 is a schematic sectional view of essential parts of the spacer of the rechargeable battery of FIG. 41.
Figure 43A:
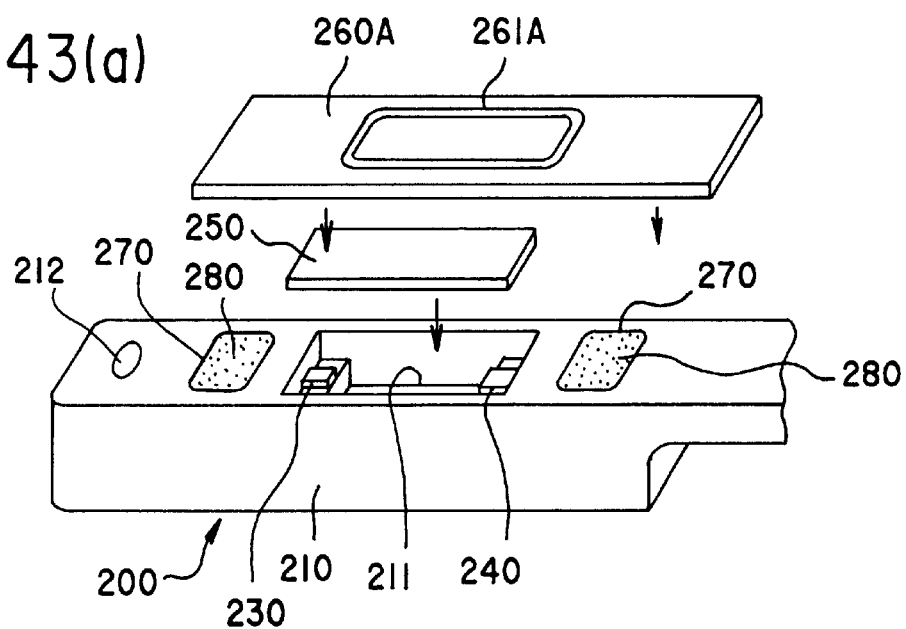
FIG. 43 is a drawing showing the spacer of the rechargeable battery of FIG. 41, in which (A) is a schematic exploded perspective view of essential parts of the spacer, and (B) is a schematic sectional view of the film sheet used in the spacer.
Figure 43B:
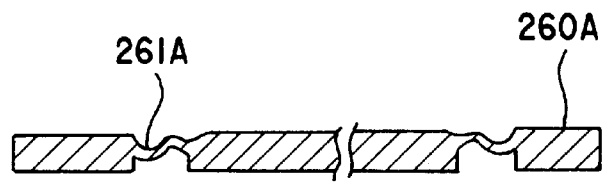

FIG. 41 is a schematic exploded perspective view showing the rechargeable battery using the pressure-crush type protective device according to a different embodiment of the invention, FIG. 42 is a schematic sectional view of essential parts of the spacer of the rechargeable battery of FIG. 41, and FIG. 43 is a drawing showing the spacer of the rechargeable battery of FIG. 41, in which (A) is a schematic exploded perspective view of essential parts of the spacer, and (B) is a schematic sectional view of the film sheet used in the spacer.

The rechargeable battery 100DA1 is similar to the rechargeable battery 100D1, except that the pressure-crush type protective device 300 is composed on the spacer 200 itself, instead of installing the pressure-crush type protective device $A_1$ or the like. Relating to the difference from the rechargeable battery 100D1, the pressure-crush type protective device 300 disposed on the spacer 200 is explained below.

In the thick wall portion 210 of the spacer 200, instead of the notch 211 provided in the rechargeable battery 100D1, a nearly rectangular parallelepiped recess 211 is formed with its opening downward.

This recess 211 is for composing the pressure-crush type protective device 300, and the recess 211 is closed by a crush plate 250 and a film sheet 260 described below, and a pressure adjusting chamber is formed. At the opposite side of the recess 211A1, supporters 211A1, 211B for supporting the crush plate 250 are provided, so that the crush plate 250 is supported at both sides.

The spacer 200 has two terminals 230, 240 formed of conductive metal pieces (same as two terminals 230, 240 of the rechargeable battery 100D1), being exposed on the supporters 211A1, 211B of the recess 211. An opening 220, a connection port 241, a connection piece 242, and a support piece for inserting 243 are formed same as in the rechargeable battery 100D1.

Near the recess 211 of the spacer 200, two holes 270 penetrating vertically are provided. Inside of the two holes 270, parts of the terminal 230 and terminal 240 are exposed. Herein, a slight gap may be formed between the resin for forming the spacer 200 and the conductive material (metal) for forming the terminals 230, 240. This gap spoils the air tightness of the recess 211 in this state. It is hence necessary to fill the holes 270 with a sealing agent 280. When the holes 270 are filled with the sealing agent 280, the holes 270 are closed themselves, and if there is a gap, the air tightness of the recess 211 is not spoiled by this gap.

When filling the holes 270 with the sealing agent 280, it is preferred to apply a pressure to the sealing agent 280. That is, when the sealing agent 280 is pressurized, if there is a gap, the gap is also filled with the sealing agent 280, so that the air tightness of the recess 211 is guaranteed more securely.

On the other hand, the crush plate 250 is a portion for forming the lid of the recess 211, and is fabricated nearly in the same size as the opening of the recess 211, so as to be fitted into the recess 211. The crush plate 250 is broken by an external pressure applied to the protective device 300. It is hence made of a relatively weak material such as ceramic, glass or plastic, and is designed in a plate thickness to be broken by a specified operating pressure, for example, about 0.1 to 0.3 mm.

It is ideal to fabricate this crush plate 250 in a size for filling the opening of the recess 211 without allowing gap and sealing, but in this invention it is enough when the crush plate 250 is easily fitted into the opening, and there is no problem if a slight gap is formed between the inner wall of the recess 211 and the crush plate 250. That is, in the invention, it is enough when a closed pressure adjusting chamber is formed by the film sheet 260 adhered to the spacer 200, and the crush plate 250 is broken directly by the external pressure applied to the protective device 300. On the other hand, if the crush plate 250 is manufactured in a small size and there is a large gap around the crush plate 250, it is hard to set the strength of the film sheet 260. Hence, it is preferred to form in a size so that the crush plate 250 maybe smoothly fitted into the recess 211.

At the upper side of the crush plate 250, a conductor 251 for electrically connecting the two terminals 230, 240 is formed in the longitudinal direction. The conductor 251 is formed of a conductive thin metal film of copper, aluminum or the like, and is formed by adhering a thin metal film to the crush plate 250, or by metal vapor deposition or sputtering. The conductor 251 maybe also formed by printing, using silver paste or copper paste. The conductor 251 is formed in a film thickness so that the conductor 251 may be broken by rupture of the crush plate 250.

The protective device 300 is, as shown in FIG. 42, supported at both sides by the supporters 211A1, 211B, at both sides of the crush plate 250, and is fitted into the recess 211 so as to cover the recess 211. The conductor 251, and terminal 230 and terminal 240 are connected electrically by using conductive adhesive, or by reflow heat using cream solder. At this time, since the conductor 251, and terminal 230 and terminal 240 are fixed by conductive adhesive or solder, it is not necessary to fix the periphery of the crush plate 250 to the inside of the recess 211. When fixing, it is enough to fix only at the disposed side of the terminal 230 and terminal 240, and the crush plate 250 is broken easily, so that a stable sensitivity is obtained.

Further, at the lower side of the pressure adjusting chamber formed of the recess 211 and crush plate 250, a film sheet 260 is provided, and the peripheral edge of the film sheet 260 is adhered to the lower end of the periphery of the recess 211 of the spacer 200 by means of adhesive, ultrasonic fusion, or heat adhesion so as to close the pressure adjusting chamber. In this structure, the crush late 250 setting a necessary crush value may be freely set and replaced easily.

The film sheet 260 is formed in a size for closing not only the pressure adjusting chamber, but also the holes 270. That is, by this film sheet 260, too, when the holes 270 filled with the sealing agent 280 are closed, the air tightness of the recess 211 is more perfect.

In this case, as shown in FIG. 42, by closing also the back side of the holes 270 with a film sheet 290 similar to the film sheet 260, the air tightness of the recess 211 is further improved.

The material of the film sheet 260 is not particularly defined as far as the pressure adjusting chamber can be closed, and, for example, it is made of various plastic materials such as polyethylene, polypropylene, and polyvinyl chloride. The film sheet 260 is preferred to have a certain flexibility because an external pressure must be applied to the crush plate 250 through the film sheet 260.

The film sheet 260 is preferred to be light-permeable. That is, when the film sheet 260 is light-permeable, if the crush plate 250 is broken, it can be visually recognized through the film sheet 260.

The spacer 200 having the protective device 300 is fabricated nearly same as in the rechargeable battery 100D1, and its explanation is omitted.

In the embodiment, the film sheet 260 is a mere sheet, but a film sheet 260A as shown in FIG. 43 may be also used.

This film sheet 260A forms bellows 261A around the portion corresponding to the inside of the recess 211 when closing the recess 211. The bellows 261A is formed more thinly than other parts, and formed in a nearly S-form section. When such bellows 261A is formed in the film sheet 260A1, the film sheet 260A is flexible enough to follow the motion when the crush plate 250 is broken. That is, by the bellows 261A1, risk of impedance of rupture of the crush plate 250 is decreased.

In the foregoing explanation, the film sheets 260, 260A are made of various plastic materials, but by using a metal vapor deposition tape, the strength can be improved. Further, by combining plural plies of the film sheets 260, the air tightness of the recess 211 may be enhanced.

Thus, in the invention, since the protective device 300 is preliminarily formed in the spacer 200, the number of components of the rechargeable battery 100 is decreased, and, unlike the process of installing the protective device later, the manufacturing process is simplified, and the manufacturing cost is curtailed.

Further, since the protective device 300 is provided in the spacer 200, no extra space is needed for installing the protective device 300, and it contributes greatly to reduction of size of the rechargeable battery 100.

The protective device 300, not having breaking means, has a structure of rupturing the crush plate directly by the internal pressure of the battery, and therefore a stable operation is obtained, and the reliability is enhanced.

The protective device 300 is composed of a small number of parts, including the recess 211 formed in the spacer 200, crush plate 250, and film sheet 260.

Moreover, since the protective device 300 is held while the both ends of the crush plate 250 are supported, the area fixed to the recess 211 is smaller, and it is broken by a smaller crush pressure, and a more stable operating pressure can be set, and a more reliable protective device 300 is realized.

In the case of this protective device 300, too, in order to enhance the sensitivity, the crush plate 250 may be provided with recess grooves at the upper side, lower side or side surface, or a hole may be formed in the center of the crush plate 250. In this case, the notch groove and hole are same as in the protective device AA2 mentioned above, as shown in FIG. 28 or FIG. 33, and its explanation is omitted.

In the protective device 300, the two holes 270 and film sheet 290 may not be provided if there is no risk of forming slightest gap between the resin for forming the spacer 200 and the conductive material (metal plate) for forming the terminals 230, 240.

As described herein, the rechargeable battery using a pressure-crush type protective device of the invention comprises a housing for accommodating an internal electrode plate in its inside, a pressure-crush type protective device disposed in the housing as a pressure-sensitive element for detecting the internal pressure, and an output terminal disposed in the housing for keeping tightness and insulation for taking out the detection result of the internal pressure detected by the pressure-crush type protective device electrically to outside.

Therefore, in the rechargeable battery using a pressure-crush type protective device, the pressure-crush type protective device is provided inside as a pressure-sensitive element, and the detection result of the internal pressure detected by the pressure-crush type protective device can be electrically picked up from the output terminal to outside. Therefore, in the device having this rechargeable battery, explosion of rechargeable battery can be prevented by utilizing the detection result. Also, in the rechargeable battery using a pressure-crush type protective device, the pressure-crush type protective device of a relatively low cost is provided, and the structure is relatively simple, and hence the cost is low. Further, in the rechargeable battery using a pressure-crush type protective device, the pressure-crush type protective device as the pressure-sensitive element is provided in the housing, and the output terminal for picking up the detection result of the pressure-crush type protective device electrically to outside is provided in the housing to keep air tightness and insulation, and therefore the pressure-crush type protective device functions securely as the pressure-sensitive element, thereby contributing to prevention of explosion in a state free from spouting of the electrolyte.

In the rechargeable battery using a pressure-crush type protective device of the invention, one terminal of the pressure-crush type protective device is connected electrically to the output terminal, and other terminal of the pressure-crush type protective device is connected electrically to one output electrode of the rechargeable battery.

Therefore, in the rechargeable battery using a pressure-crush type protective device, since the other terminal of the pressure-crush type protective device is electrically connected to the other output electrode of the rechargeable battery, only one output terminal is enough, instead of the pair of output terminals, so that the rechargeable battery may be smaller in size and lower in cost.

The rechargeable battery using a pressure-crush type protective device of the invention relates to the rechargeable battery using a pressure-crush type protective device, in which the pressure-crush type protective device comprises a pressure adjusting container forming a recess, a crush plate having a conductor for closing the pressure adjusting container, and a pair of terminals electrically connected to the conductor.

Therefore, in the rechargeable battery using a pressure-crush type protective device, the pressure-crush type protective device provided for preventing explosion does not require cut-off means, and the structure is relatively simple, and the size can be reduced, so that it is applicable to reduction of size of rechargeable battery. Further, the pressure-crush type protective device can be manufactured at low cost, and the cost of the rechargeable battery can be also lowered. The pressure-crush type protective device functions securely as the pressure-sensitive element, and it contributes to prevention of explosion of rechargeable battery. Since the pressure-crush type protective device can be reduced in size, if the rechargeable battery has a spacer, it can be provided by cutting the spacer, so that extra space for installation is not needed.

The rechargeable battery using a pressure-crush type protective device of the invention relates to the rechargeable battery using a pressure-crush type protective device, in which the pressure-crush type protective device comprises a pressure adjusting container forming a recess, a crush plate having a conductor supported at both sides in the recess of the pressure adjusting container for covering this recess, a pair of terminals electrically connected to the conductor of the crush plate covering the recess of the pressure adjusting container, and a film sheet for closing the pressure adjusting container.

Therefore, in the rechargeable battery using a pressure-crush type protective device, aside from the same effects as the effects of the rechargeable battery using a pressure-crush type protective device of the invention, because of the structure of supporting the crush plate at both sides, the sensitivity is higher than that of the pressure-crush type protective device used in the rechargeable battery using a pressure-crush type protective device. As a result, the rechargeable battery of higher sensitivity for prevention of explosion is presented.

The rechargeable battery using a pressure-crush type protective device of the invention relates to the rechargeable battery using a pressure-crush type protective device, in which the pressure-crush type protective device is a pressure-crush type protective device used in a rechargeable battery comprising an internal electrode plate, a positive electrode (or negative electrode) output electrode, a sealing body for closing the opening of an jacket serving also as other electrode, and a spacer disposed beneath the sealing body for insulating between the sealing body and the internal electrode plate, and comprises a crush plate having a recess and a conductor formed in the spacer, fitted in the recess, and forming a pressure adjusting chamber in the recess, a pair of terminals connected electrically to the conductor, and a film sheet adhered to the spacer for sealing the pressure adjusting chamber.

Therefore, in the rechargeable battery using a pressure-crush type protective device, in the rechargeable battery having the spacer, the pressure-crush type protective device can be composed in the spacer in a relatively simple structure. Hence, nearly same effects as the effects of the rechargeable battery using a pressure-crush type protective device are obtained.

The rechargeable battery using a pressure-crush type protective device of the invention relates to the rechargeable battery using a pressure-crush type protective device, in which the pair of terminals are formed in the spacer by inserting.

Therefore, in the rechargeable battery using a pressure-crush type protective device, the manufacturing process may be further simplified.

The rechargeable battery using a pressure-crush type protective device of the invention relates to the rechargeable battery using a pressure-crush type protective device, in which the film sheet is light-permeable.

Therefore, in the rechargeable battery using a pressure-crush type protective device, since the film sheet is light-permeable, it can be visually checked if the crush plate is broken or not through the film sheet.

The rechargeable battery using a pressure-crush type protective device of the invention relates to the rechargeable battery using a pressure-crush type protective device, in which the pressure-crush type protective device is a pressure-crush type protective device used in a rechargeable battery comprising an internal electrode plate, a positive electrode (or negative electrode) output electrode, a sealing body for closing the opening of an jacket serving also as other electrode, and a spacer disposed beneath the sealing body for insulating between the sealing body and the internal electrode plate, and comprises a crush plate having a recess and a conductor formed in the spacer, fitted in the recess, and forming a pressure adjusting chamber in the recess, a pair of terminals formed in the spacer by inserting and connected electrically to the conductor, and a film sheet adhered to the spacer for sealing the pressure adjusting chamber, and the spacer has an opening for exposing a part of the terminals, the opening is filled with a sealing agent to close the gap between the resin for forming the spacer and the conductive material for forming the terminals, and the film sheet also closes the opening.

Therefore, in the rechargeable battery using a pressure-crush type protective device, if the pressure-crush type protective device is formed in the spacer, by filling the opening with the sealing agent, the air tightness of the pressure adjusting chamber for composing the pressure-crush type protective device can be securely assured. Meanwhile, nearly same effects as the effects of the rechargeable battery using a pressure-crush type protective device are obtained.

The rechargeable battery using a pressure-crush type protective device of the invention relates to the rechargeable battery using a pressure-crush type protective device, in which a notch groove for adjusting the pressure is provided in the crush plate.

Therefore, in the rechargeable battery using a pressure-crush type protective device, the sensitivity is further improved by forming the notch groove in the crush plate of the pressure-crush type protective device.

The rechargeable battery using a pressure-crush type protective device of the invention relates to the rechargeable battery using a pressure-crush type protective device, in which the pressure-crush type protective device comprises a pressure adjusting container forming a recess, a crush plate having a conductor supported at one side in the recess of the pressure adjusting container for nearly covering this recess, a pair of terminals electrically connected to the conductor of the crush plate nearly covering the recess of the pressure adjusting container, and a film sheet for closing the pressure adjusting container.

Therefore, in the rechargeable battery using a pressure-crush type protective device, since the crush plate is supported at one side, the sensitivity of the pressure-crush type protective device may be further enhanced. Meanwhile, nearly same effects as the effects of the rechargeable battery using a pressure-crush type protective device are obtained.

The rechargeable battery using a pressure-crush type protective device of the invention relates to the rechargeable battery using a pressure-crush type protective device, in which the pressure-crush type protective device comprises a main body forming a penetration hole, a lid body fitted to this main body for closing the penetration hole, and a bottom body fitted to the main body at the opposite side of the lid body side for closing the penetration hole, and the lid body has a conductor layer for passing over the penetration hole in a state fitted to the main body.

Therefore, in the rechargeable battery using a pressure-crush type protective device, the pressure-crush type protective device can be also formed in such structure. In this case, too, nearly same effects as the effects of the rechargeable battery using a pressure-crush type protective device are obtained.

The rechargeable battery using a pressure-crush type protective device of the invention relates to the rechargeable battery using a pressure-crush type protective device, in which the lid body is formed more thinly than the main body and the bottom body.

Therefore, in the rechargeable battery using a pressure-crush type protective device, the lid can be crushed securely, instead of the bottom, in this pressure-crush type protective device.

The rechargeable battery using a pressure-crush type protective device of the invention relates to the rechargeable battery using a pressure-crush type protective device, in which the pressure-crush type protective device comprises a main body forming a recess, and a lid body fitted to this main body for closing the recess, and the lid body has a conductor layer for passing over the recess in a state fitted to the main body.

Therefore, in the rechargeable battery using a pressure-crush type protective device, the component corresponding to the bottom body is not needed in this pressure-crush type protective device, and the number of parts can be curtailed. In this case, too, nearly same effects as the effects of the rechargeable battery using a pressure-crush type protective device are obtained.

The rechargeable battery using a pressure-crush type protective device of the invention relates to the rechargeable battery using a pressure-crush type protective device, in which the pressure-crush type protective device comprises a first main body forming a recess, and a second main body having a recess, the bottom of the recess of the first main body is formed more thinly than the bottom of the recess of the second main body, the conductor layer is formed at the back side of the first main body and in the portion corresponding to the bottom of the recess, and when the both main bodies are combined with the recesses face to face, a space formed by both recesses and a communicating portion for communicating with outside are formed between the both main bodies.

Therefore, in the rechargeable battery using a pressure-crush type protective device, the pressure-crush type protective device can be formed in such structure. In this case, too, nearly same effects as the effects of the rechargeable battery using a pressure-crush type protective device are obtained.

The portable electronic device of the invention is a portable electronic device having a rechargeable battery, in which the rechargeable battery is a rechargeable battery using a pressure-crush type protective device.

Therefore, in the portable electronic device, since the rechargeable battery used therein is the rechargeable battery using a pressure-crush type protective device, the same effects are mentioned above are obtained. It hence presents a portable electronic device capable of preventing explosion of the contained rechargeable battery, without spouting of the electrolyte, in a relatively simple structure and a low cost.

INDUSTRIAL APPLICABILITY

The rechargeable battery of the invention may be used in the portable electronic device such as portable telephone, video camera, and others.

What is claimed is:

1. A rechargeable battery using a pressure-crush protective device comprising a housing for accommodating an electrode plate in its inside, a pressure-crush protective device disposed in said housing as a pressure-sensitive element for detecting the internal pressure, an output terminal which is separate from an output electrode of said rechargeable battery disposed in said housing for keeping tightness and insulation for taking out the detection result of the internal pressure detected by said pressure-crush protective device electrically to outside, and a controller which breaks a circuit component if the internal pressure is higher than a specified value.

2. The rechargeable battery using a pressure-crush protective device of claim 1, wherein one terminal of said pressure-crush protective device is connected electrically to said output terminal, and other terminal of said pressure-crush protective device is connected electrically to one output electrode of the rechargeable battery.

3. The rechargeable battery using a pressure-crush protective device of claim 1 or 2, wherein said pressure-crush protective device comprises a pressure adjusting container forming a recess, a crush plate having a conductor for closing said pressure adjusting container, and a pair of terminals electrically connected to said conductor.

4. The rechargeable battery using a pressure-crush protective device of claim 1 or 2, wherein said pressure-crush protective device comprises a pressure adjusting container forming a recess, a crush plate having a conductor supported at both sides in the recess of said pressure adjusting container for covering this recess, a pair of terminals electrically connected to the conductor of the crush plate covering the recess of the pressure adjusting container, and a film sheet for closing said pressure adjusting container.

5. The rechargeable battery using a pressure-crush protective device of claim 1 or 2, wherein said pressure-crush protective device is used in a rechargeable battery comprising an internal electrode plate, a positive electrode (or negative electrode) output electrode, a sealing body for closing the opening of a jacket serving also as other electrode, and a spacer disposed beneath said sealing body for insulating between said sealing body and said internal electrode plate, and comprises a crush plate having a recess and a conductor formed in said spacer, fitted in said recess, and forming a pressure adjusting chamber in said recess, a pair of terminals connected electrically to said conductor, and a film sheet adhered to said spacer for sealing said pressure adjusting chamber.

6. The rechargeable battery using a pressure-crush protective device of claim 5, wherein said pair of terminals are formed in said spacer by inserting.

7. The rechargeable battery using a pressure-crush protective device of claim 5, wherein said film sheet is light-permeable.

8. The rechargeable battery using a pressure-crush protective device of claim 1 or 2, wherein said pressure-crush protective device is used in a rechargeable battery comprising an internal electrode plate, a positive electrode (or negative electrode) output electrode, a sealing body for closing the opening of a jacket serving also as other electrode, and a spacer disposed beneath said sealing body for insulating between said sealing body and said internal electrode plate, and comprises a crush plate having a recess and a conductor formed in said spacer, fitted in said recess, and forming a pressure adjusting chamber in said recess, a pair of terminals formed in said spacer by inserting and connected electrically to said conductor, and a film sheet adhered to said spacer for sealing said pressure adjusting chamber, and said spacer has an opening for exposing a part of said terminals, said opening is filled with a sealing agent to close the gap between the resin for forming the spacer and the conductive material for forming the terminals, and said film sheet also closes said opening.

9. The rechargeable battery using a pressure-crush protective device of claim 3, wherein a notch groove for adjusting the pressure is provided in said crush plate.

10. The rechargeable battery using a pressure-crush protective device of claim 1 or 2, wherein said pressure-crush protective device comprises a pressure adjusting container forming a recess, a crush plate having a conductor supported at one side in the recess of said pressure adjusting container for partially covering this recess, a pair of terminals electrically connected to the conductor of the crush plate partially covering the recess of the pressure adjusting container, and a film sheet for closing said pressure adjusting container.

11. The rechargeable battery using a pressure-crush protective device of claim 1 or 2, wherein said pressure-crush protective device comprises a main body forming a penetration hole, a lid body fitted to this main body for closing said penetration hole, and a bottom body fitted to the main body at the opposite side of the lid body side for closing said penetration hole, and said lid body has a conductor layer for passing over said penetration hole in a state fitted to the main body.

12. The rechargeable battery using a pressure-crush protective device of claim 11, wherein said lid body is formed more thinly than the main body and the bottom body.

13. The rechargeable battery using a pressure-crush protective device of claim 1 or 2, wherein said pressure-crush protective device comprises a main body forming a recess, and a lid body fitted to this main body for closing said recess, and said lid body has a conductor layer for passing over said recess in a state fitted to the main body.

14. The rechargeable battery using a pressure-crush protective device of claim 1 or 2, wherein said pressure-crush protective device comprises a first main body forming a recess, and a second main body having a recess, the bottom of the recess of said first main body is formed more thinly than the bottom of the recess of the second main body, the conductor layer is formed at the back side of the first main body and in the portion corresponding to the bottom of the recess, and when the both main bodies are combined with the recesses face to face, a space formed by both recesses and a communicating portion for communicating with outside are formed between the both main bodies.

15. A portable electronic device having a rechargeable battery, wherein said rechargeable battery is a rechargeable battery using a pressure-crush protective device as set forth in claim 1 or 2.

16. A rechargeable battery using a pressure-crush protective device comprising a housing for accommodating an electrode plate in its inside, a pressure-crush protective device disposed in said housing as a pressure-sensitive element for detecting the internal pressure, and an output terminal which is separate from an output electrode of said rechargeable battery disposed in said housing for keeping tightness and insulation for taking out the detection result of the internal pressure detected by said pressure-crush protective device electrically to outside.

* * * * *